(12) United States Patent
Sureka et al.

(10) Patent No.: US 12,347,221 B1
(45) Date of Patent: Jul. 1, 2025

(54) MACHINE-LEARNING MODELS FOR IMAGE PROCESSING

(71) Applicant: Citibank, N.A., New York, NY (US)

(72) Inventors: Ashutosh K. Sureka, Irving, TX (US); Venkata Sesha Kiran Kumar Adimatyam, Irving, TX (US); Miriam Silver, Tel Aviv (IL); Daniel Funken, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/943,672

(22) Filed: Nov. 11, 2024

Related U.S. Application Data

(63) Continuation-in-part of application No. 18/629,259, filed on Apr. 8, 2024.

(51) Int. Cl.
  *G06K 9/00* (2022.01)
  *G06V 20/00* (2022.01)
  (Continued)

(52) U.S. Cl.
  CPC .............. *G06V 30/41* (2022.01); *G06V 20/95* (2022.01); *G06V 30/19093* (2022.01);
  (Continued)

(58) Field of Classification Search
  None
  See application file for complete search history.

(56) References Cited

U.S. PATENT DOCUMENTS

| 8,688,579 B1 | 4/2014 | Ethington et al. |
| 9,137,417 B2 | 9/2015 | Macciola et al. |

(Continued)

FOREIGN PATENT DOCUMENTS

| CA | 3188665 A1 | 3/2024 |

OTHER PUBLICATIONS

Chernov, Timofey S., Sergey Allyuhin, and Vladimir V. Arlazarov. "Application of dynamic saliency maps to the video stream recognition systems with image quality assessment." Eleventh International Conference on Machine Vision (ICMV 2018). vol. 11041. SPIE, 2019. (Year: 2018).

(Continued)

*Primary Examiner* — S J Park
(74) *Attorney, Agent, or Firm* — Foley & Lardner LLP

(57) ABSTRACT

Presented herein are systems and methods for the employment of machine learning models for image processing as may be performed by computing devices associated with an end user. A method may include obtaining video data comprising a plurality of frames including a document of a document type. The method may include executing an object recognition engine of a machine-learning architecture using image data of the plurality of frames, the object recognition engine trained to detect edges of documents. The method may include identifying, based on the edge detection, a plurality of boundaries for the document. The method may include validating, based on the plurality of boundaries, the document as the document type. The method may include transmitting via one or more networks, to a computer remote from the computing device, responsive to the validation of the type of document, the image data for the plurality of frames depicting the document.

20 Claims, 18 Drawing Sheets

(51) Int. Cl.
*G06V 30/19* (2022.01)
*G06V 30/41* (2022.01)
*G06V 30/42* (2022.01)
*H04L 9/40* (2022.01)

(52) U.S. Cl.
CPC ........ *G06V 30/19147* (2022.01); *G06V 30/42* (2022.01); *H04L 63/08* (2013.01)

(56) References Cited

U.S. PATENT DOCUMENTS

| | | | |
|---|---|---|---|
| 9,672,510 | B2 | 6/2017 | Roach et al. |
| 10,019,772 | B1 | 7/2018 | Smith |
| 10,115,031 | B1 | 10/2018 | Pashinstev et al. |
| 10,339,374 | B1 | 7/2019 | Pribble et al. |
| 10,635,898 | B1 | 4/2020 | Pribble |
| 10,803,431 | B2 | 10/2020 | Hinski |
| 11,068,976 | B1 | 7/2021 | Voutour et al. |
| 11,321,679 | B1 | 5/2022 | Bueche et al. |
| 11,900,755 | B1* | 2/2024 | Bueche, Jr. .......... G07D 7/2016 |
| 12,039,504 | B1* | 7/2024 | Foster .................... G06Q 20/42 |
| 12,106,590 | B1 | 10/2024 | Kinsey |
| 2007/0233615 | A1* | 10/2007 | Tumminaro ............ H04L 63/08 705/75 |
| 2011/0091092 | A1 | 4/2011 | Nepomniachtchi et al. |
| 2011/0243459 | A1 | 10/2011 | Deng |
| 2012/0230577 | A1 | 9/2012 | Calman et al. |
| 2014/0270464 | A1 | 9/2014 | Nepomniachtchi et al. |
| 2015/0003666 | A1 | 1/2015 | Wang et al. |
| 2015/0032631 | A1 | 1/2015 | Hinski |
| 2015/0063653 | A1 | 3/2015 | Madhani et al. |
| 2015/0120572 | A1* | 4/2015 | Slade ................. G06Q 20/3224 705/73 |
| 2015/0278819 | A1* | 10/2015 | Song .................... G06Q 20/042 705/45 |
| 2015/0294523 | A1 | 10/2015 | Smith |
| 2015/0309966 | A1 | 10/2015 | Gupta et al. |
| 2016/0037071 | A1 | 2/2016 | Emmett et al. |
| 2016/0125613 | A1 | 5/2016 | Shustorovich et al. |
| 2016/0253569 | A1 | 9/2016 | Eid et al. |
| 2017/0116494 | A1 | 4/2017 | Isaev |
| 2017/0185833 | A1 | 6/2017 | Wang et al. |
| 2018/0211243 | A1 | 7/2018 | Ekpenyong et al. |
| 2018/0330342 | A1 | 11/2018 | Prakash et al. |
| 2018/0376193 | A1 | 12/2018 | Sullivan et al. |
| 2019/0019020 | A1 | 1/2019 | Flament et al. |
| 2019/0197693 | A1 | 6/2019 | Zagaynov et al. |
| 2019/0213408 | A1 | 7/2019 | Cali et al. |
| 2020/0410291 | A1 | 12/2020 | Kriegman et al. |
| 2021/0124919 | A1 | 4/2021 | Balakrishnan et al. |
| 2021/0350516 | A1 | 11/2021 | Tang et al. |
| 2021/0360149 | A1 | 11/2021 | Mukul |
| 2021/0365677 | A1 | 11/2021 | Anzenberg |
| 2022/0224816 | A1 | 7/2022 | Pribble et al. |
| 2022/0358575 | A1 | 11/2022 | Smith |
| 2022/0414955 | A1 | 12/2022 | Ota |
| 2023/0281629 | A1* | 9/2023 | Shevyrev ............... G06Q 40/02 705/44 |
| 2023/0298370 | A1 | 9/2023 | Nishioka |
| 2024/0061992 | A1 | 2/2024 | Bhatia et al. |
| 2024/0176951 | A1 | 5/2024 | Krishnamoorthy |
| 2024/0256955 | A1 | 8/2024 | Goodsitt et al. |
| 2024/0303658 | A1 | 9/2024 | Cohen et al. |
| 2024/0428550 | A1 | 12/2024 | Gutierrez Valdes et al. |

OTHER PUBLICATIONS

Rybakova et al., "PESAC, the Generalized Framework for RANSAC-Based Methods on SIMD Computing Platforms", IEEE Access, pp. 82151-82166, 2023, vol. 1.

* cited by examiner

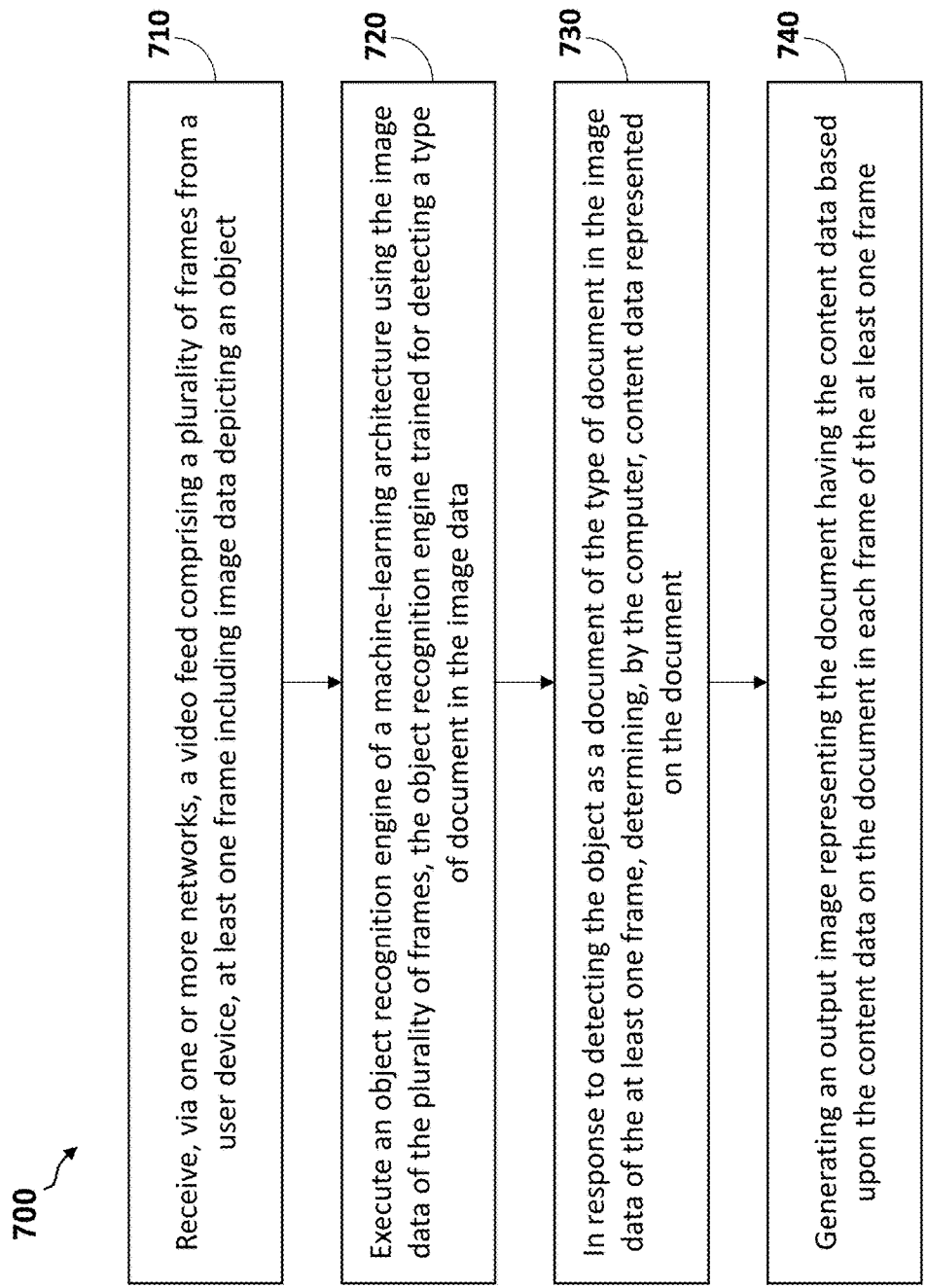

MACHINE-LEARNING MODELS FOR IMAGE PROCESSING

CROSS-REFERENCE TO RELATED APPLICATIONS

This application is a continuation-in-part of U.S. application Ser. No. 18/629,259, filed Apr. 8, 2024, which is incorporated by reference in its entirety.

TECHNICAL FIELD

The application generally relates to the field of detecting and processing content data from image data.

BACKGROUND

Depositing checks or other instruments can involve manual processes, such as traveling to a staffed location that has limited open hours. Checks can also be deposited by mail, though such delivery can incur latency of several days. In either case, however, trained personnel can inspect a check to verify authenticity and legibility. Further, non-optical features such as magnetic ink and tactile surfaces can aid in retrieving a data content of the check or establishing an authenticity thereof. Moreover, dedicated equipment can capture images of check according to a standard orientation, lighting, and so forth.

Some bank or non-bank institutions may offer a remote deposit capture option, wherein an image of a check is provided to the institution for processing. Although such an option may obviate a portion of the latency, travel, and staffing associated with other check deposits, it may be challenging to verify an identity of a user or an authenticity of the check. Further, detailed instructions provided to a user may not be rigorously adhered to and, in any case, may mitigate the convenience of the remote deposit capture option. Improvements in the art are desired.

Many existing mobile check deposit solutions help automate certain operations or processes using images of checks or documents, but they have various technological shortcomings. A technical problem is the inconsistent quality of check images captured by users' mobile devices. For instance, common issues in mobile check deposits include low light conditions the produce images with insufficient detail for accurate processing or a user's shaky hand results in poor-quality images that can cause errors during check processing.

Another technological challenge relates to fraud detection or identity management in mobile solutions. Remote banking applications are often inaccurate or impose time-consuming processes for verifying the identity of a user who initiates or participates in a remotely requested operation involving an image of an instrument (e.g., making a deposit with an image of a check), or for validating the authenticity of the requested operation or the image of the instrument.

Furthermore, many existing mobile check deposit solutions rely heavily on backend servers to perform the bulk of the image processing, validation, and fraud detection tasks. This reliance and burden at the backend servers can result in delays and require significant server resources.

SUMMARY

Institutions may receive electronic facsimiles of documents from remote users, from which information is extracted (e.g., financial instruments, such as checks). For example, the electronic facsimiles can be received as image data from a mobile device having a camera. The electronic provision of these documents may render inspection difficult. For example, a check may include any of various sizes, background images, and fonts (including combinations of handwritten portions and machine-printed portions). Further, such a system may be employed by various users under a combination of environmental conditions and/or hardware configurations (e.g., cameras, image processing hardware/firmware, etc.). Moreover, document security features, such as holograms, microprint, embossing, or security strips may be difficult to validate based on image data, in addition to the validation of the user themselves. Even where such document security features are validated (e.g., not mechanically manipulated), electronic manipulation of image data may remain a concern.

What is needed is a computing system that improves upon existing systems and methods of remote deposit capture, including systems and methods that capture document information from image data received from a client device. Such a system can address technical problems of extracting information from documents in image data corresponding to the disparate environments and hardware of users. Further, such a system can address technical problems of validation of an identity of any of a document, a mobile device, or a user, such as a validation of an authenticity relative to a risk score threshold.

Embodiments discussed herein include systems and methods to provide, from a client device such as a mobile phone, a video feed to a server. The video feed can include, for example, streaming video or saved video files including image data. The system can, according to various modules implemented on either of the client device or the server, extract information from the image data of the video files. For example, the system can detect a check or other document from the image data, and extract information of or related to the check. For example, the system can extract deposit amounts, account information, or other discrete fields of a check, along with indications of authenticity of the check, the mobile device, a user, or the video feed itself. For example, the system can determine a presence or absence of anomalies in the video feed or provide a user with prompts such as discrete selections or dynamic alignment indicators of the check. The system can further generate a representative image of the document, such as by selecting one or more images of a check from the image data, (e.g., generating the representative image from multiple selected images). In some embodiments, the systems and methods can solicit additional to bolster a confidence or risk score to exceed a threshold.

Embodiments may include systems and methods for client-side validation of document-imagery for remote processing. The systems and methods may include a computing device comprising at least one processor for performing operations or method comprising: obtaining, by a camera of a mobile client device associated with an end-user, video data including a plurality of frames including a document of a document type of the document; executing, by the mobile client device, an object recognition engine of a machine-learning architecture to extract a first set of document features from image data of the plurality of frames captured by the camera of the mobile client device; executing, by the mobile client device, the object recognition engine on the first set of document features to detect the document type of the document based upon the first set of document features, the object recognition engine trained to detect the document type of the document using a set of document features and corresponding training labels indicating the document type of the document having the set of document features; executing, by the mobile client device, the object recognition engine to extract a second set of document features from the image data, the second set of document features are extracted based upon the document type of the document detected using the first set of document features; generating, by the mobile client device, a document validation score indicating a likelihood that the document is a valid document based upon the second set of document features extracted from the image data; upon validating the document based on determining that the document validation score satisfies a document validation threshold, generating, by the mobile client device, a packaged image extracted from the image data of at least one frame of the plurality of frames of the video data captured by the mobile client device; and generating, by the mobile client device, an operation instruction for a backend server, the operation instruction including the packaged image and device metadata identifying the mobile client device.

When validating the document mobile client device may identify a dimension similarity between the document and the document type of the document, based upon comparing a plurality of boundaries corresponding to a plurality of edges of the document in the first set of document features against a predefined dimension having a plurality of expected boundaries for the document type of the document.

When the identifying the dimension similarity, the mobile client device may match the plurality of boundaries to the predefined dimension having the plurality of expected boundaries for a plurality of document issuers. Each of the plurality of expected boundaries correspond to a document issuer of the plurality of document issuers.

The mobile client device may generate an indication of validation for presenting via a user interface of the mobile client device. The mobile client device may generate an indication that the document validation score exceeds a warning threshold for presenting via a user interface of the mobile client device.

When validating the document, the mobile client device may compare the document validation score against at least one of a second validation threshold corresponding to non-validation and a warning threshold corresponding to an alert trigger. The mobile client device may generate an output indicator for display at a user interface, based upon comparing the document validation score against the at least one of the second validation threshold or the warning threshold.

When validating the document, the mobile client device may identify at least one of a first set of validation criteria corresponding to clerical or imaging errors or a second set of validation criteria corresponding to digital or mechanical manipulation of the document.

The machine-learning architecture may a classification model configured to classify the document the document type of the document. The machine-learning architecture may include an edge-detection model configured to detect one or more edges of a rectangle bounding the document for validating the document.

The mobile client device may generate a spatial transform for the document responsive to detecting a plurality of edges of the document of the first set of document features.

Wherein validating the document, the mobile client device may identify a subset of the video data including the document. The mobile client device may compare the subset against an occupancy threshold.

The image data transmitted to the backend server remote from the mobile client device may be transmitted in an output video feed including multiple of the plurality of frames of the video data.

Embodiments may include systems and methods for client-side validation of document-imagery for remote processing. The systems and methods may include a computing device comprising at least one processor for performing operations or method comprising obtaining, by a camera of a mobile client device associated with an end-user, video data including a plurality of frames including a document of a document type, an operation request having operation information received via a user interface of the mobile client device, and environment imagery about the document at a time of the operation request; executing, by the mobile client device, an object recognition engine of a machine-learning architecture to extract a set of content features representing content data of a plurality of content fields on the document from image data of a portion of the plurality of frames, the object recognition engine trained for detecting the plurality of content fields for the document type and the content data of the plurality of content fields; generating, by the mobile client device, a second set of content features based upon at least the operation information received via the user interface of the mobile client device; executing, the mobile client device, the object recognition engine to extract a set of environment features from the environment imagery, the object recognition engine trained for detecting the set of environment features using the environment imagery and corresponding training labels indicating expected environment imagery; generating, by the mobile client device, an operation validation score based upon a content similarity between the set of content features and the second set of content features, and an image similarity between the set of environment features and the expected environment imagery, the operation validation score indicating a likelihood that the document is a valid document and is associated with the operation request; upon validating the operation request based on determining that the operation validation score satisfies an operation validation threshold, generating, by the mobile client device, a packaged image extracted from the image data of at least one frame of the plurality of frames of the video data captured by the mobile client device; and generating, by the mobile client device, an operation instruction for a backend server, the operation instruction including the packaged image and device metadata identifying the mobile client device.

The mobile client device may determine a similarity score between first data of a first content field of the document and second data, differing from the first data, of a second content field of the document.

The mobile client device may detect an omission for a content field of the plurality of content fields. The mobile client device may generate an indication of the omission for display via the user interface of the mobile client device.

The object recognition engine ma be configured to determine a legibility of one or more content fields of the plurality of content fields.

The mobile client device may determine, according to first selection criteria, the legibility of a first field type of the plurality of content fields. The mobile client device may determine, according to second selection criteria, the legibility of a second field type of the plurality of content fields.

When generating the operation validation score, the mobile client device may determine a document validation score for the document. The mobile client device may compare the document validation score against at least one of a first threshold corresponding to non-validation or a second threshold corresponding to an alert trigger. The mobile client device may generate an output indicator for display at the user interface of the mobile client device based upon comparing the document validation score against the first threshold or against the second threshold.

When generating the operation validation score, the mobile client device may identify at least one of a first set of validation criteria corresponding to clerical or imaging errors, or a second set of validation criteria corresponding to digital or mechanical manipulation of the document.

When generating the operation validation score the mobile client device may generate a quality score for the document using the image data of one or more frames of the plurality of frames. The mobile client device may determine whether the image data of the one or more frames satisfies a quality threshold based upon comparing the quality score against the quality threshold.

When generating the operation validation score the mobile client device may generate a fidelity score for the document using the image data of one or more frames of the plurality of frames. The mobile client device may determine whether the one or more frames satisfies a fidelity threshold based upon comparing the fidelity score to against the fidelity threshold.

The mobile client device may transmit the packaged image to the backend server via one or more networks.

Embodiments may include systems and methods for client-side validation of document-imagery for remote processing. The systems and methods may include a computing device comprising at least one processor for performing operations or method comprising obtaining, by a camera of a mobile client device associated with an end-user, video data including a plurality of frames having image data including a document and an operation request associated with the image data received via a user interface of the mobile client device; extracting, by the mobile client device executing an object recognition engine, a set of document features from the image data containing the document; generating, by the mobile client device executing the object recognition engine, a user validation score based upon the set of document features extracted for the document, wherein the object recognition engine includes a machine-learning architecture trained to identify a registered user using the set of document features and corresponding training labels indicating the registered user having an expected set of document features, the user validation score indicating a likelihood that the end-user is the registered user based upon a similarity between the set of document features extracted for the document and the expected set of document features for the registered user; upon validating the end-user as the registered user based on determining that the user validation score satisfies a user validation threshold, generating, by the mobile client device, a packaged image extracted from the image data of at least one frame of the plurality of frames of the video data captured by the mobile client device; and generating, by the mobile client device, an operation instruction for a backend server, the operation instruction including the packaged image and device metadata identifying the mobile client device.

When obtaining the operation request the mobile client device may be configured to receive via the user interface of the mobile client device the operation request indicating at least one operation to be performed in accordance with the document in the image data.

The mobile client device may be configured to, in response to validating the end-user as the registered user, transmit the image data of the document to the backend server via one or more networks.

The mobile client device may be configured to execute one or more remedial operations for the operation request, in response to determining that the user validation score fails to satisfy the user validation threshold. A remedial operation of the one or more remedial operations may include at least one of: generating a prompt for additional authenticating data of the end-user for display at the user interface, halting the operation request, or halting an application executed at the mobile client device.

When obtaining the image data, the mobile client device may be configured to parse pixel data at a portion of the image data containing the portion of the document. The mobile client device may be configured to extract the set of document features of the document using the portion of the pixel data, and generate the user validation score based upon the set of document features extracted for the portion of the document.

When obtaining the image data includes the mobile client device may be configured to receive a video feed from the camera including the plurality of frames containing the image data containing the document.

When obtaining the image data includes mobile client device may be configured to receive the video data including the plurality of frames having the image data from the camera of the mobile client device.

The mobile client device may be configured to train the object recognition engine for detecting the set of document features of the document based upon a training dataset including a plurality of training document images corresponding to the training labels, at least one training label indicating a document type of the document.

The mobile client device may be configured to train the object recognition engine for generating the user validation score based upon a training dataset including a plurality of prior document images associated with the registered user corresponding to the training labels. At least training label indicates at least one of a user identifier associated with the registered user and a corresponding prior document image, or the set of document features of the corresponding prior document image.

BRIEF DESCRIPTION OF THE DRAWINGS

The accompanying drawings constitute a part of this specification, illustrate an embodiment, and together with the specification, explain the subject matter of the disclosure.

FIG. 7 is a flowchart illustrating operations of a method for remotely processing document imagery, in accordance with some embodiments.

DETAILED DESCRIPTION

Figure 1:
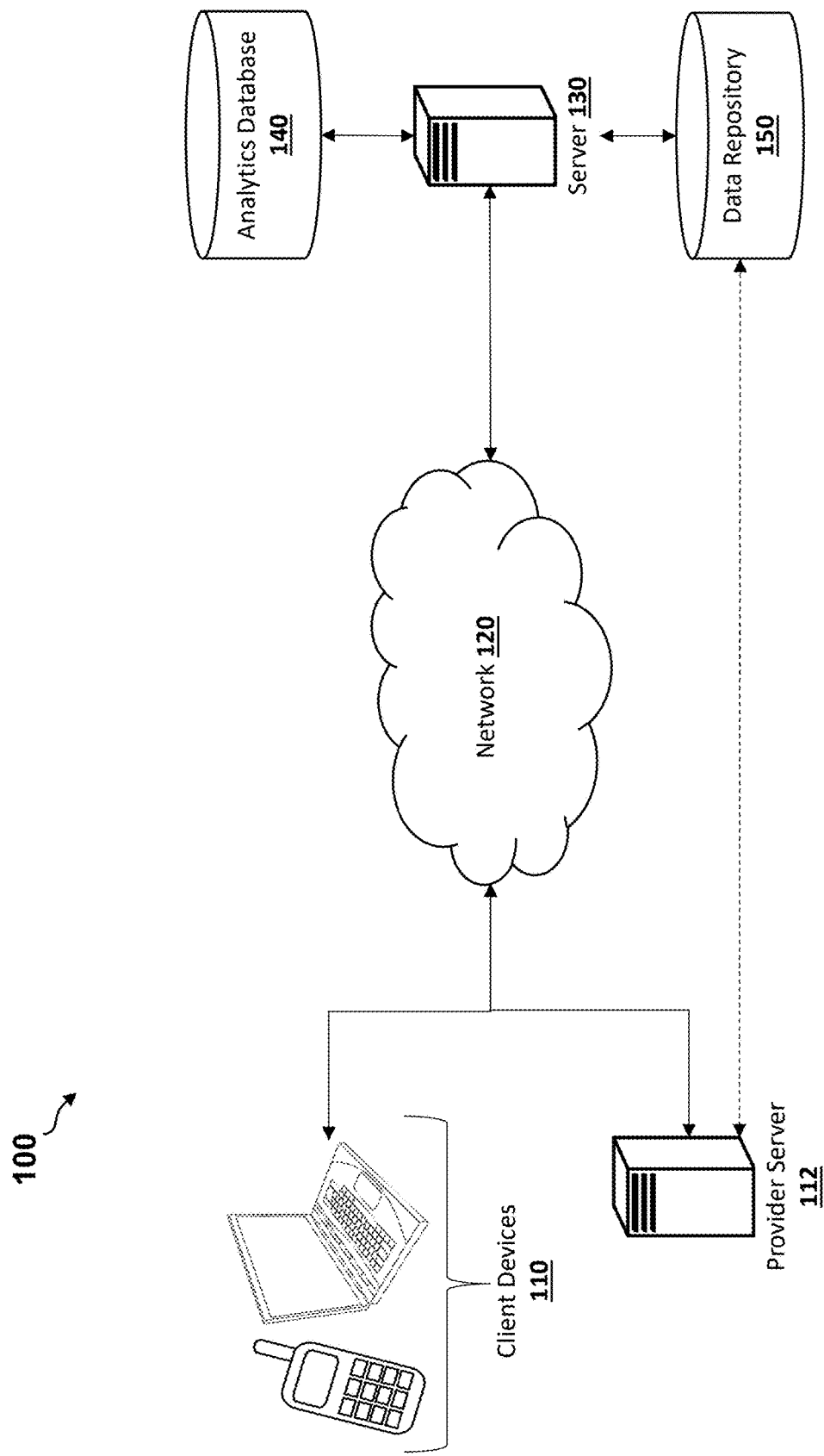
FIG. 1 is a block diagram showing computing components of a system for video and image processing, in accordance with some embodiments.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Many existing mobile operations software programs involve image data remotely captured at users' mobile devices, which may have inconsistent or questionable quality in image data. These solutions often produce inconsistent quality of document images captured by the users' mobile devices. Embodiments disclosed herein include machine-learning models of an object recognition engine trained to analyze visual attributes of pixel data (e.g., blurriness, lighting, skewed angles) to compensate for (and, in some implementations, automatically enhance) attributes or aspects of the image data and document object, such as image clarity or distortions. The object recognition engine may improve accuracy and consistency in extracting features and feature vectors representing details or attributes of document objects (e.g., content information, dimensions). This improves both the success rate of check deposits and user experience.

A common issue in mobile operations using image data (e.g., mobile check deposits) is that low light conditions or a user's shaky hand can result in poor-quality images, which can cause errors during check processing. Embodiments disclosed herein address these technical shortcomings using machine learning models of an machine-learning architecture, which may be executed by software such as an object recognition engine, where the machine-learning models may be trained to detect, recognize, and extract features of a document or object in image data to, which may include attributes of the document object (e.g., dimensions, lines, content, anti-counterfeit imagery). The object recognition engine or other software programming may include programming or machine-learning models be trained to compensate for (and, in some implementations, correct) various types of image defects caused by suboptimal capture conditions.

As an example, in low light scenarios, the machine-learning model of the object recognition engine is trained to compensate for (or enhance) image brightness and contrast to reveal sufficient detail, such that a document's attributes or content information (e.g., amounts, dates, names, signatures) remains legible. As another example, the machine-learning model of the object recognition engine may be trained to compensate for (or enhance) motion blur or shaky hand movements by, for example, reducing blur, improve contrast, or stabilizing the image, among other techniques for compensating for blur and otherwise reducing the need for users to retake videos or photos. This results in higher quality images that are suitable for processing even in challenging capture conditions, improving both the reliability of the deposit process and the user experience.

The various types of document images and sources of document images may come in a variety of formats and layouts. Existing solutions may have difficulty accounting for the variety of document attributes, which can cause errors during automatic processing. Embodiments described herein address this heterogeneity by implementing object recognition engine or other software having machine learning models trained on a diverse training dataset of check formats. This trained object recognition engine enables the software programming to accurately and consistently process various layouts, fonts, and other unique attributes of different document types, without requiring manual adjustments. Moreover, the machine-learning models may be re-trained on new training datasets to adapt to new and different documents presented to the object recognition engine.

A related technological problem includes automated detection of fraudulent document objects within the image data associated with operation requests. As explained further below, embodiments herein include machine learning models of an object recognition engine or other software programming trained to identify unusual patterns in the appearance or image data of document object (e.g., mismatches in font type, inconsistencies in signatures, signs of tampering). The machine-learning model may generate fraud risk detection or document validation score for automated fraud detection. The object recognition engine may provide a real-time, secure mechanism for reducing the risk of fraudulent check deposits.

Another technological challenge relates to fraud detection or identity management in mobile solutions. Remote banking applications are often inaccurate or impose time-consuming processes for verifying the identity of a user who initiates or participates in a remotely requested operation involving an image of an instrument (e.g., making a deposit with an image of a check), or for validating the authenticity of the requested operation or the image of the instrument. Embodiments disclosed herein include machine learning models trained to extract and correlate document features for visual attributes of a document in image data with user-specific patterns of registered or expected users (e.g., past deposit or operations behaviors, handwriting recognition, image or operation metadata such as geolocation data). This ensures the frontend application or backend operation-processing servers can accurately validate the user and/or the requested operations, thereby reducing the risk of errors, unauthorized access, fraudulent operations.

Furthermore, many existing mobile check deposit solutions rely heavily on backend servers to perform the bulk of the image processing, validation, and fraud detection tasks. This reliance and burden at the backend servers can result in delays and require significant server resources. Embodiments disclosed herein may address these potential shortcomings by shifting much of the processing workload onto the users' mobile devices. By deploying machine learning models and software operations for image-processing and initiating operations directly on the mobile device, the mobile application enables real-time image analysis, validation (e.g., user validation, operation validation, document validation), and fraud detection, without relying as heavily on server-side processing. This reduces server load, enhances user privacy by minimizing the transmission of sensitive data, and speeds up the overall check deposit process, providing a more efficient and responsive user experience. Additionally, this distributed processing approach reduces latency and can function even with limited or unstable internet connections, as much of the work is done locally on the user's device.

Embodiments discussed herein include a system that may capture image data for a document, such as a check. For example, the image data may be captured by a mobile device. The image data can be conveyed to a server via a video feed of streaming data or a video file including a sequence of frames. The image data can be conveyed to the server as captured or may be processed before transmission to the server. For example, the image may be compressed, post processed, or manipulated by any of the operations described with respect to the server prior to transmission (e.g., to reduce file size, processing time, or energy usage by the server). In some embodiments, at least a portion of the image processing can be performed remote from the capturing device. Such a schema may improve an anomaly detection rate wherein a received image omits or reduces digital processing and may further reduce inconsistencies related to device hardware of various capture devices.

The system (e.g., the server) can process the image data to determine a presence of a particular document, such as a check. For example, the system can determine a presence, legibility, and identity of the document via a comparison to reference data (e.g., image feature vectors). For image data from video, the system can determine such document information for each frame individually or based on a sequence of frames to, for example, select an image or combination of images for other operations (e.g., optical character recognition (OCR)), or to detect anomalies such as frame-to-frame inconsistencies.

Upon a detection of the document, the system can discriminate between a background image from the document (e.g., via bounding boxes). The background image may include image data surrounding, around, or nearby the document, such as ambient or environment imagery (e.g., desk or tabletop, lighting quality, components of a room or setting) or a user imagery (e.g., facial biometrics image), among other types of captured imagery or attributes of the imagery (e.g., lighting) that does not include the document. In such cases, the system can extract various types of features or feature vectors, such as a set of facial features or a set of environment features using the environment imagery. In some embodiments, the system can provide dynamic alignment indication, via a user interface, to aid a user capturing the image data, which may iteratively provide feedback to improve a quality of received image data. For example, the dynamic alignment indication may be based on the bounding boxes. The server can cause a presentation of either of the bounding boxes or other dynamic alignment indicators via a user interface of a user device.

The capture, conveyance, and/or processing of the various frames can be halted upon a detection of a document (e.g., a check). For example, the server can issue a halt command immediately upon a detection of the document, upon receiving a predetermined number of frames including the document or subsequent to the detection of the document, or according to a predetermined time, number of frames, quantity of data conveyed, or otherwise in response to the video feed and the content thereof.

Upon a receipt of the image data, the server can extract content data therefrom. The content data can include content data from the check or other document. For example, the system can extract a numeric or other value corresponding to an account number, deposit amount, address, image quality, liveness score, or other aspect. In some embodiments, the value may include a binary indication of a comparison to a threshold. The content data can further include relevant information associated with the image data (e.g., metadata). Such metadata can include information from a mobile wallet (e.g., token, pin, or other indicia of identity), location indicia (e.g., GPS coordinates or wireless networks associated with a location), and so forth. Further image data extracted from the image data can include additional content data other than from the document. For example, background information, an image of a user in the image data (e.g., biometric data or images of a hand adjusting the check), or frame to-frame variations can embed information related to a liveness score of the video or other indications of risk (e.g., frame-to-frame behavior of a holographic security feature of a check).

The server can generate a risk score associated with any fraud or changes of a document included in image data (e.g., mechanical manipulation), the image data itself (e.g., digital manipulation, such as deepfakes), or other associated data (e.g., via pattern matching).

In some embodiments, the server can generate prompts for presentation by the capturing device (e.g., the mobile device). For example, the prompts may be generated responsive to a risk score exceeding a threshold. Prompts can include requests for additional information such as entry of a pin or other secure passphrase, biometric data such as image data of a face or thumbprint, etc. Prompts can include requests or instantiation of actions such as telephonic communication, two-factor authentication (2FA), enablement of location services, additional image data capture of the document, or particular portions thereof (e.g., deposit amount, security features, etc.), information exchange with a financial institution such as a drawee bank or automated clearing house (ACH), or a hold placed on a financial instrument.

FIG. 1 is a block diagram showing computing components of a system 100 for video and image processing, in accordance with some embodiments. The network environment of the system 100 can include any number of client devices 110 in network communication with a server 130 (sometimes referred to as a "backend server"). The server 130, like the client devices 110, can be in network communication with one or more databases 140, 150. For example, the server 130 can be in network communication with one or more analytics databases 140, data repositories 150, or provider servers 112.

The various devices of the system 100 can exchange information over a network 120. The network 120 can include a local network 120 and/or another network 120, such as a mobile telephone network 120. The (e.g., local) network 120 may employ various network topologies such as Wi-Fi networks based on any one of the Institute of Electrical and Electronics Engineers ("IEEE") 802.11 standards, wired networks based on any of the IEEE 802.3 networks, and so forth. For example, the network 120 can include Bluetooth, Direct Subscriber Line (DSL), Data Over Cable Service Interface Specification (DOCSIS), or satellite communications. Communicative connections over the network 120 can include a first link employing a first network topology or protocol and a second link employing a second network topology or protocol.

The network 120 may include any number of security devices or logical arrangements (e.g., firewalls, proxy servers, DMZs) to monitor or otherwise manage network traffic. Security devices may be configured to analyze, accept, or reject data exchanges with any of various client devices 110, provider servers 112, servers 130, or databases. In some embodiments, the security device may be a physical device (e.g., a firewall). Additionally or alternatively, the security device may be a software application (e.g., Web Application Firewall (WAF)) that is hosted on, or otherwise integrated into, another computing device of the system 100.

Aspects of the client device 110 are provided in accordance with some illustrative embodiments. Merely for brevity of the present specification, some components of the client device 110 are not further described with reference to the server 130. However, in some embodiments, any of the components or functionality of the client device 110 may be included in the server 130. Likewise, in some embodiments, the client device 110 can include any of the components or functionality of the server 130. Further, in some embodiments, a first portion of a component or functionality may be implemented on the client device 110 and a second portion of the component or functionality may be implemented on the server 130, such as the illustrative example of the image data selector 204 provided henceforth.

The client device 110 may be any electronic device comprising hardware (e.g., at least one processor, non-transitory machine-readable storage medium) and software components capable of performing the various tasks and processes described herein. Non-limiting examples of the client device 110 may include mobile client devices (e.g., mobile phones), tablets, gaming consoles, laptops, smart watches, desktop computers, and personal computers, among others, which may be owned or used by a user. The client device 110 may include a processor, non-transitory memory, graphical user interface, and network interface. The client device 110 may include or receive media via a camera. The client device 110 may execute a mobile wallet application associated with the server 130. An example of the graphical user interface may be presented at a display screen (e.g., touchscreen) of the client device 110. The network interface is provided for communicating over the network 120. The structure of the network interface will depend on how the client device 110 interfaces with the network 120. For example, if the client device 110 is a mobile phone or tablet, the network interface may include a transmitter, receiver, or transceiver with an antenna for sending and receiving wireless transmissions to or from the other devices of the system 100.

Either of the client device 110 or the server 130 can include any number of constituent computing devices, sensors, or the like. For example, either of the client device 110 or the server 130 can be implemented via multiple physical or virtualized computing devices, each executing a service or microservice to implement an aspect of the present disclosure. Although a single instance of a client device 110 is depicted, embodiment of the present disclosure can interface with any number of such devices 110. For example, one or more instances of the server 130 can interface with thousands or millions of client devices 110, in some embodiments.

In some embodiments, the client device 110 can include a mobile device. The client device 110 may include any electronic computing device comprising hardware and software components capable of performing the various processes and tasks described herein. Non-limiting examples of the client device 110 include laptops, desktops, and mobile computing devices (e.g., smart phones, tablets), among others. In some embodiments, the server 130 may be implemented in a virtualized environment or a dedicated physical server. In some embodiments, the client device 110 and the server 130 can be implemented on a same computing device. References to a processor can include one or more physical devices such as general-purpose arithmetic logic units or, analog circuitry, function-specific digital circuitry, or other processing apparatuses. In some embodiments, a processor of the system may be distributed across a client device 110 and the server 130. For example, the processor can include a first processor of the client device 110, and a second processor of the server 130. The first and second processors can, in turn, include multiple processors themselves. For example, they may be implemented as multiple processors distributed across various server racks, virtual containers, or cores of a discrete device.

The client device 110 includes or is coupled to one or more sensors for capturing and generating videos and/or pictures. The sensors can include a camera to capture image data (e.g., video data, photo data) of various types of documents, such as checks. The camera can include or interface with local photo processing or adjustment tools. For example, the camera can include an autofocus, exposure adjustment, post-processor (e.g., image sharpener), or the like. The client device 110 transmits (e.g., batch file transmission; data streaming) video as captured (or as post-processed) to the server 130.

The client device 110 or the server 130 may execute a compression engine that includes software programming for compressing the image data or certain types of data extracted from the image data, such as feature vectors extracted from frames of video data. The camera of the client device 110 can include or interface with a compression engine. In some cases, the compression engine of the client device 110 or the server 130 executes image data compression functions for reducing the size of the image data (e.g., reducing an amount of binary data of the video data). For example, the compression engine performs video compression functions that compress individual frames of a video file or a video stream according to a video compression algorithm (e.g., H.264 or MPEG). In some cases, a compression engine of the client device 110 or the server 130 executes data compression functions for reducing an amount or dimensionality of features or feature vectors extracted, by a machine-learning architecture, from the image data. Additionally or alternatively, in some cases, the client device 110 or the server 130 executes a compression engine for reducing an amount of image data and/or video data by selecting and processing the image data of a subset of frames of a video stream. In this way, the server 130 need not receive and process an entire video. The server 130 processes the subset of selected frames or sequence of frames.

The image processing functions of the server 130 may select certain frames of the video for performing various processing functions on the image data corresponding to the selected frames. The server 130 may select the frames based on a user selection, a determination that the image data of the frame from the video feed exceeds a quality threshold or other metric (as determined by a machine learning architecture executing an engine related to data content or image characteristic thereof) or based on image characteristics of immediately preceding or subsequent frames.

Figure 2:
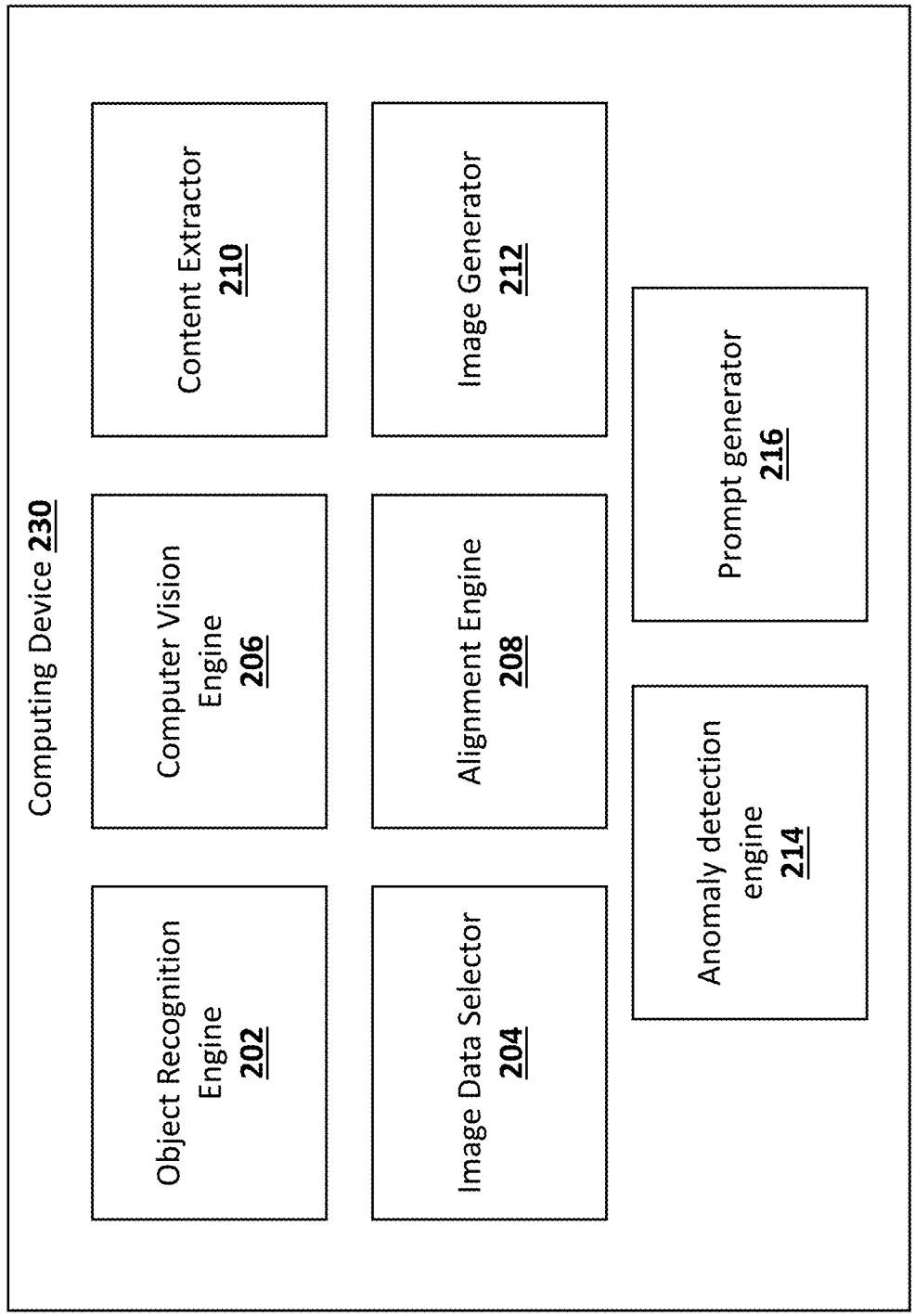
FIG. 2 depicts a block diagram of a computing device, in accordance with some embodiments.

As mentioned, in some embodiments, the execution of the compression engine can compress selected features of the image data of a single frame or multiple frames (e.g., via the content extractor 210 of FIG. 2). For instance, the selected features can include visual image characteristics (e.g., portions of an image exterior to a bounding box or a dynamic alignment indicator) that may be represented by preconfigured types of representational features. As an example, the machine-learning architecture of the server 130 (or client device 110) may extract a set of features from the image data of the frames to form a feature vector corresponding to the document in the video. The machine-learning architecture executed by the server 130 includes layers or functions that can apply a transform function to all or a subset of the frames. In some embodiments, the client device 110 may execute the transform functions on the frames of the image data prior to transmitting the image data and/or feature-related data to the server 130. For example, the server 130 can extract and reduce the features, feature vector, transform, or histogram associated with the image data in the video feed. Such transforms can include visual transforms, such as de-skewing or reorienting, or other transforms, such as transformations of the hyperplane or various further phase spaces.

The client device 110 can generate a video feed including image information for transmission to the server 130. In some embodiments, the video feed can include a live feed provided contemporaneously to its capture. In some embodiments, the video feed can include a conveyance of stored image data (e.g., a video file). For example, the stored image data can be provided according to a video format such as .MP4, .AVI, or .MPG. In some embodiments, the image data, a portion thereof, or information accompanying the image data can include features extracted from the image data, such as image feature vectors, compressed data, annotations, etc. In some embodiments, the video feed can include image data selected randomly from captured data, or responsive to a detection of an object within the image data (e.g., a detection of an existence of an object or a comparison of the object to an image quality threshold).

The client device 110 can provide a streaming video feed or the saved video files in response to an indication received from the anomaly detection engine 214 of the server 130 (e.g., according to an available network bandwidth or a fraud risk associated with a user, device, location, or mobile wallet). The client device 110 may determine to send a video stream or full video file based on the indication from the server 130. The client device 110 can determine to send a first subset of the video feed, and thereafter provide a second subset in response to a second indication received from the server 130. For example, the server 130 can provide the second indication in response to determining that a risk score for the first subset exceeding a threshold of the anomaly detection engine 214.

The client device 110 can generate an overlay for presentation via a display integral thereto, or otherwise coupled therewith. For example, the client device 110 can generate any of the displays depicted in FIGS. 4A-4E. The client device 110 can include a mobile wallet. For example, the mobile wallet can include account or payment information, such as access to one or more accounts. The mobile wallet can interface with accounts, to aid in the remote deposit of checks. The client device 110 can include one or more identifiers, (e.g., unique identifiers). The device identifiers may include identifiers of the mobile device, including telephone numbers, International Mobile Equipment Identities (IMEI), MAC addresses, Universally Unique Identifiers (UUID), advertising identifiers, etc. The device identifiers may include identifiers of the mobile wallet, such as a wallet ID, account number, token, biometric data, etc. Any such information may be available to the server 130, via a network connection with the client device 110 itself, or as received from a data repository 150 accessible to the server 130. Some data stored by the data repository 150 may be duplicative to information stored on the client device 110. Some data stored by the data repository 150 may otherwise correspond to information stored on the client device 110 (e.g., a corresponding key of an asymmetric key pair, a hash of biometric data, etc.). Accordingly, in some embodiments, the server 130 may verify an identity based on a comparison between information received from a client device 110 and corresponding information retrieved from the data repository 150.

The sensors of the client device can include a location sensor configured to generate location coordinates or other location data. For example, a Global Navigation Satellite System (GNSS), such as Global Positioning System (GPS), may be employed to generate location coordinates. Such location data can be provided to the server 130 as fine or course location data. In some embodiments, the location sensor can include other sensor types. For example, the location sensor can include a Wi-Fi transceiver or cellular modem to detect a presence or Received Signal Strength Indicator (RSSI) of proximal wireless networks. Such wireless networks may or may not be associated, by the server 130, with a particular geographic location. For example, the location data can include an indication of a proximity of a wireless network or other indicia of location without explicit indication of a particular geographic location.

The provider servers 112 can include third party or other remote data sources. For example, the provider servers 112 can include an automated clearing house (ACH) or an addressable location for further entities. The entities can include financial institutions corresponding to data content of the document, such as according to a linkage between a routing number, address, or other source indica of a check, and a linkage to the financial institutions stored in the data repository corresponding to such source indica. Any networked components can exchange data with the provider servers 112. For example, the server 130 can cause a check image (e.g., a composite check image) to be conveyed to initiate an ACH transaction for a deposit or settlement thereof. Likewise, networked components can receive data from the ACH or other provider servers 112. For example, in some embodiments, any of the information of the data repository 150 can be received from the provider servers 112. In some embodiments, a provider server 112 can exchange data with the networked devices via off-line data transfer (such as to batch transfer image training data, location data, metadata, etc.).

The analytics database 140 can include any of the models discussed herein. References to a machine learning model employed by a component of the server 130 can refer to various models according to any of the description provided herein. For example, in some embodiments, the server 130 can employ a same trained model for various components. The server 130 can retrieve the various models for execution according to a machine learning architecture thereof.

In some embodiments, the various models of the analytics database 140 may include separate models for each of the various components discussed herein. For example, a first feature extraction model can extract features to identify a document in video frames, a second feature extraction model can determine features to determine an image quality, a third feature extraction model can determine features to generate a bounding box for the check, and a fourth feature extraction model can extract content data (e.g., account numbers and deposit amounts) from various fields of the document. Such models can include, for example, one or more same components (e.g., a thresholder to define an edge between a document and a background) trained with different data (e.g., first training data to discriminate between a presence or absence of a check, second training data to discriminate between a legible and illegible document, and so forth). In this way, training data may be specific to a particular task (e.g., non-check documents can be used as positive class data to determine document legibility, but negative class data to determine if a check is present).

The analytics database 140 can include feature vectors (sometimes referred to as embeddings, without limiting effect) corresponding to image data of one or more frames. For example, the embeddings can encode image characteristics such as color, texture, or shapes. A feature vector may include indicia of a check type or source (e.g., logos, images, addresses, routing numbers, patterns, or so forth). The source can include a financial institution, check printer, check book, physical location, etc. For example, a feature vector stored in the analytics database 140 can include indicia of a watermark pattern which is associated with a user or a drawee of a check. If a drawee is known according to previous checks having blue checkered backgrounds, then a check having a green striped background may be indicative of an anomaly, such as a low-quality image or fraudulent activity.

In some embodiments, aspects of the feature vector may correspond to images or other data stored by the data repository 150. For example, such information can include field information (e.g., deposit amounts, sequential check numbers, or so forth) or other account such as location data or account history. The server can employ the information of the analytics database 140 in combination with the data repository 150 to detect anomalous behavior. For example, if a check is regularly provided in an amount of $123.45, then a check of $5,123.45 received according to such a schedule may be anomalous.

A feature vector may include indicia of anomalies, such as blurring or smudging, texture irregularities, an absence or degradation of a watermark or other image, irregular characters spacing, and so forth. Such indicia can indicate that a document has been manipulated, counterfeit, or damaged (e.g., to activate a chemically sensitive ink). In some embodiments, the feature vector can embed temporal information, such as frame-to-frame features, of the feature vector. Inconsistent or abrupt motions or jitter can indicate a presence of an anomaly detected according to the operations of the machine learning environment disclosed herein. The detection of the anomaly can further be based on location data. For example, a location associated with high incidence of fraud or a perfectly stationary location (e.g., lacking jitter) can be indicative of an anomaly.

The analytics database 140 can store a reference feature vector. A reference feature vector can refer to a reference such as a "known good" document, or various further document classifications (e.g., a digital manipulated image, low confidence OCR image, high quality image, moderate quality image, or the like). A reference feature vector can be derived from one or more images. For example, an image quality reference feature vector can be a composite of hundreds or thousands of high quality images, with other dimensionality excised (e.g., to include checks from various banks, drawees, printers, or other document such as textbook scans, identification card scans, etc.). Other reference feature vectors can include fewer source images. For example, a reference feature vector for a small credit union or particular drawee can be derived from one or several image feature vectors. In some embodiments, a feature vector can include non-image information such as an account balance, credit or other risk-based score, location data, etc.

The analytics database 140 can include thresholds to correspond to any of the feature vectors, or features thereof (e.g., one or more dimensions of a hyperplane). For example, a quality threshold can relate to a quality of an image, or a similarity threshold can relate to a level of matching or similarity between a received image a reference feature vector (e.g., of a drawee or other source). For brevity, "thresholds" may be referred to as binary thresholds such that a particular input can exceed or not exceed. However, according to various embodiments, any of the thresholds disclosed herein can be gradated, such as to include high, medium, and low levels. Such gradations can be employed by the machine learning architecture disclosed herein, such as according to the prompt generator 216 of FIG. 2. For example, a deposit with a low fraud score may be deposited and made immediately available; a deposit with a moderate fraud score may be deposited and a hold issued pending further action; a deposit with a high fraud score may be rejected.

Any of the models of the analytics database 140 can be trained from training data of the data repository 150. The data repository 150 can include image data received from various client devices 110, account data such as user profile information (e.g., photographs, billing or mailing addresses, user behavior (e.g., geodata), metadata associated with the image data (e.g., location data), etc.). For example, the data repository 150 can include information associated with a particular client device 110 (e.g., previously deposited checks) or from further client devices 110 (e.g., checks deposited from other users). The image data can include check images from a same source. Such sources can include, for example, a same endorser, drawee bank or other institution, or a check printer, to include an authorized printer or unauthorized printer (e.g., counterfeiter). In some embodiments, the server 130 may cause any of the data of the data repository 150 to be vectorized for ingestion by the analytics database 140.

The information stored in the data repository 150, which may be used to train the models of the analytics database 140, can include unlabeled, auto labeled, or manually labeled data. For example, in some embodiments the content data is associated with a predefined label, category, or classification. In some embodiments the content data is processed to determine patterns, clusters, or structures without reference to predefined labels.

The data repository 150 can exchange information with any of various internal or external sources. For example, the data repository 150 can receive image data or associated metadata from the provider server 112 (e.g., an ACH, third party financial institution, etc.). The data repository 150 can include a linkage with one or more data elements of the analytics database 140. For example, the analytics database 140 can include image vectors, or other representations of information in the data repository 150 associated with image data (e.g., frames or video files) of the data repository 150.

An identifier (e.g., unique identifier, account number, timestamp, etc.) can link image data or other information of the data repository 150 with a feature vector or other representation of the analytics database 140. In some embodiments, the data repository 150 can provide image data along with any associated transaction data, such as a transaction identifier, deposit amount, deposit account, etc. For example, the image data provided to the provider server 112 can include a representative image of a document, such as an image generated from one or more frames of the video feed. Likewise, as indicated above, such information can be incorporated in feature vectors including image data.

FIG. 2 depicts a block diagram of a computing device 230 (e.g., client device 110, server 130, provider server 112), in accordance with some embodiments. For example, the depicted computing device 230 can be employed as a server 130 in the system 100 of FIG. 1. The computing device 230 can execute software executable functions or features of a machine learning architecture. The various functions or features may be referred to as engines or other components of the machine learning architecture, without limiting effect.

The machine learning architecture of the computing device 230 includes layers and functions that are defined by or executed as software routines of the object recognition engine 202. The object recognition engine can detect, within image data, an object. For example, the execution of the object recognition engine 202 can identify a document such as a check within a video feed. The object recognition engine 202 can include an image preprocessor. The execution of the image pre-processor can perform noise reduction, image resizing, contrast adjustment, edge detection (to determine the presence of the check or field demarcation), etc. In some embodiments, in addition to (or instead of) the object recognition engine 202, other aspects of a system 100 can be executed, by the machine learning architecture, to preprocess images. For example, a camera or mobile wallet application of a mobile device may be configured to adjust contrast, image size, denoising, etc. In some embodiments, the object recognition engine 202 can share one or more components with other aspects of the system disclosed herein. For example, edge detection may be performed via one or more components of the computer vision engine 206 (e.g., a bounding box generator). Such an illustrative example is not intended to be limiting. In some embodiments, the execution of the object recognition engine 202 can implement a separate preprocessor or share additional components with other aspects of the system 100. For example, in some embodiments, the execution of the object recognition engine 202 can implement a same component of a feature extractor as the execution of the content extractor 210.

An execution of the object recognition engine 202 can invoke a feature extractor to detect features of the check which may be used to tag the frame data of the video feed as including or excluding a document such as a check. An indication that a document is included may include an indication that the document is physically present, or that features can be extracted from the image. For example, the feature extractor can determine geometric characteristics, such as a shape, size, orientation, resolution, sharpness, focus, pixel-wise image intensity, or so forth. Such features may be provided to the analytics database 140 for comparison to further images according to the execution of the object recognition engine 202 by the machine learning architecture.

A classifier of the object recognition engine 202 can classify image data according to one or more of the extracted features. For example, the classifier can include a support vector machine (SVM), decision trees/random forest, neural network, Bayesian (e.g., Naïve Bayes), an ensemble model of one or more of such models, etc. In some embodiments, the classifier is a binary classifier to discriminate between a presence of a check and an absence of a check. In some embodiments, the classifier is a non-binary classifier to discriminate between various document classifications (e.g., a hand-written check, pre-printed check, front or rear facing of a check, potentially fraudulent check, check which is similar to previously deposited checks, blurred or other compromised image of a check, image data which has been digitally manipulated, document which has been mechanically manipulated, etc.).

In some embodiments, the execution of the object recognition engine 202 implements the classifier separately for each frame of the video feed. For example, the execution of the object recognition engine 202 can cause the classifier to determine a subset of frames including a check (or other image classifications) and tag such frames. When used with at least some frame formats, subsets or combinations of frames may be employed for such frame-by-frame tagging. For example, the classifier can tag only intra-coded (I) frames, or combinations of I-frames with predictive (P)-frames or Bidirectional-Predictive (B)-frames. In some embodiments, the execution of the object recognition engine 202 can cause the classifier to determine a tag for one or more frames based on further combinations of frames (e.g., preceding or subsequent frames), such as according to a memory state model. For example, the object recognition engine 202 can include a recursive neural network (RNN) such as a Long Short-Term Memory (LSTM) model.

Any of the models of the object recognition engine 202 can be retrieved, by the computing device 230, from the analytics database 140 for execution. Moreover, any image data or other content data received by the machine learning architecture can be stored at the data repository 150 and may, in turn, be used to train the models. Any detection, determination, or so forth realized by the machine learning architecture can be appended to an image feature vector, image metadata, or otherwise stored at the data repository 150. For example, the data can be stored as a label annotation.

The machine learning architecture of the computing device 230 includes layers and functions that are defined by or executed as software routines of the image data selector 204. The image data selector 204 can select image data of a frame. For example, the image data selector 204 can select frames according to a quality of the image data thereof. The images can refer to at least one frame including an object, such as a check. The frames can include any of an I-frame or a combination of an I-frame with a B-frame or P-frame.

In some embodiments, the machine learning architecture can execute the image data selector 204 to select frames from all frames of a document, or a subset of frames. For example, the execution of the image data selector 204 can cause a receipt of a subset of frames based on the identification of a document (e.g., a check) from the object recognition engine 202. Moreover, the execution of the image data selector 204 can cause the machine learning architecture to select image data from a subset of the individual frames. For example, the machine learning architecture can execute the image data selector 204 to select image data corresponding to a check and not to a background, or of one or more subfields of the check (e.g., MICR symbols which are present on multiple checks, an endorsee signature, or so forth). In some embodiments, the image data selector 204 determines a quality (e.g., similarity) score for a document on a frame-to-frame basis. In some embodiments, the image data selector 204 determines the quality score on a field-to-field basis, or for a sequence of frames. In some embodiments, the image data selector 204 employs spatial-temporal patching to determine a quality of a portion (e.g., one or more fields) of a document over a period of time (e.g., a frame sequence). According to such an embodiment, the image data selector 204 can determine an image quality for more than one portion of the check. Thus, various fields of the check having a highest quality score (or a quality score in excess of a threshold), may originate from different frames.

In some embodiments, a reference feature vector of the analytics database 140 may be associated with a reference image of the data repository 150. For example, a reference image can include a labeled image. The labeled image may be labeled manually, or according to a semi-supervised process. For example, a first image can be manipulated to generate any number of derivative reference images. The derivative reference images can include, for example, added noise, skewing, reduced resolution, or reduced dimensionality according to various phase spaces. Thus, the reference images (and feature vectors corresponding thereto) may vary in quality according to a known amount.

The similarity comparison of the feature vector is not intended to be limiting. In some embodiments, other dimensions of quality may be employed. For example, in some embodiments, the image data selector 204 can perform text or other annotations for one or more fields of an object detected in the frame. A generative AI model, such as a large-language model (LLM) or a multimodal LLM, can ingest the text annotations and compare the annotated text to corresponding annotations of various images which are labeled as to a quality (e.g., as exceeding a quality threshold or not exceeding a quality threshold). In some embodiments, the image data may be manipulated (e.g., noised, skewed, reduced dimensions, etc.) to compare to the LLM, such that the LLM comparison can determine a dimensionality or compression level of the unmanipulated image (e.g., by adding a known quantity of noise, image annotation may be degraded a quantifiable amount, indicative of an original quality of source image data).

In some embodiments, the image data selector 204 can select image data from a sample of frames. For example, the image data selector 204 can determine a quality of a random sample of frames, or periodic frames (e.g., every $10^{th}$ frame). Upon a determination that an object in a frame exceeds a quality threshold (or is the highest quality of the sample of frames), the image data selector 204 can determine a quality for adjoining frames.

In some embodiments, the execution of the image data selector 204 can cause the machine learning architecture to select a frame or a sequence of frames for a front facing of a document, and a frame or a sequence of frames for a rear facing of a document. In some embodiments, the execution of the image data selector 204 can cause the machine learning architecture to terminate upon a selection of the frame or sequence of frames exceeding the quality threshold. In some embodiments, the execution of the image data selector 204 can cause the machine learning architecture to process all frames or all sampled frames to determine a highest quality frame. Such a determination can be made via a comparison to a reference feature vector (e.g., a quality feature vector). In some embodiments, multiple feature vectors corresponding to various frames of the video feed are compared to each other. For example, the compared feature vectors can include feature vectors having reduced dimensionality to as to be predictive of quality (e.g., retraining planes which exhibit correlation to quality in excess of a threshold and omitting planes which do not exhibit correlation to quality in excess of the threshold).

The quality can refer to a legibility of text or other image characteristics (e.g., a sharpness or recognition of security features). In some embodiments, the quality is determined according to a similarity to a reference feature vector. The reference feature vector can be defined from a single reference image, or according to a combination of multiple reference images. For example, the reference feature vector can include features from one or more images indicative of legibility (e.g., corresponding to sharpness, contrast, dynamic range, or noise). The machine learning architecture can execute the image data selector 204 to select a frame based on a similarity with a reference. For example, the execution of the image data selector 204 can generate a feature vector for the image data for comparison to the reference feature vector. The generated feature vector can be generated via a feature extractor of the image data selector 204.

A similarity may refer to a distance between the reference feature vector and the generated feature vector. For example, the distance can refer to a cosine distance, Euclidean distance, Chebyshev distance, or so forth. In some embodiments, a similarity threshold refers to a distance threshold (e.g., a cluster boundary between a cluster including the reference feature vector and another cluster boundary). Such a distance can be between separate frames or other spatial or spatial-temporal patches of the video feed, or relative to a selected reference feature vector.

In some embodiments, a selection of a reference feature vector can depend on a classification of the object recognition engine. For example, a separate reference may be retrieved, by the server, according to a bank of a drawee, a handwritten or pre-printed check, a hardware configuration of the client device 110, or other aspects of the document or image data received by the computing device 230.

In some embodiments, various dimensions of the feature vector for image data can be cast into textual strings. The machine learning architecture can include a large language model (LLM) configured to ingest such strings to determine image characteristics including image quality. Either of the LLM or the image feature vector can be pruned of dimensions which are not predictive of quality. Thusly, the generation of the feature vector and the subsequent ingestion of the LLM can form a two stage feature pipeline to provide an indication of quality.

The computing device 230 can execute a computer vision engine 206 to identify or otherwise define and annotate or label the image data to indicate a boundary between the object (e.g., document) detected by the object recognition engine 202 and other portions of the image data. The machine-learning architecture includes layers and functions that are defined by or executed as software routines of the computer vision engine 206. The computer vision engine 206 can generate a label or annotation for pixels or portions of the image data, such as a bounding box, to bound a check from a background of one or more frames of video data. The machine-learning model of the computer vision engine 206 is trained to identify and annotate various types of documents. In some embodiments, the computer vision engine 206 can label or annotate the document based on information received from the object recognition engine 202 (e.g., object data such as a centroid, edge, or other image characteristic). The computer vision engine 206 may receive an indication of features corresponding to pixel information of the image data and outputs annotation information associated with the image data, such as pixel information indicating vertices of the bounding box situated within updated annotated image data. As an example, the computer vision engine 206 may define a rectangular bounding box having vertices corresponding to the pixel information (e.g., a bounding box) at or within in a proximity threshold to the detected document object edge. In this example, the pixel information includes a minimum X pixel location, minimum Y pixel location, maximum X pixel location, and maximum Y pixel location, among other types of pixel information for presenting the image data containing the annotated object (e.g., a bounding box situated around a check).

The execution of the computer vision engine 206 need not receive and implement pixel-level information from the object recognition engine 202. In some implementations, the computer vision engine 206 can receive a binary indication of presence, or other classification of a type of object of an image, from the object recognition engine 202. The computer vision engine 206 may process frames based on the receipt of such information. For example, the computer vision engine 206 includes a machine-learning model or other layers and functions of the machine-learning architecture trained to determine image features for the frames of the image data having a classified object (e.g., type of document), responsive to the indication of the detected presence. The computer vision engine 206 can generate elements for an augmented reality (AR) display of an augmented image. For example, the computer vision engine 206 can generate bounding box information for an augmented image.

As mentioned, the computer vision engine 206 includes a machine-learning model or other layers or functions of the machine-learning architecture trained to identify an object to annotate a boundary (e.g., define pixels for a bounding box) between a document and a background or other image data of the video feed. For example, the computer vision engine 206 can employ feature detection (e.g., via the feature extractor of the object recognition engine 202, or another feature extractor). The computer vision engine 206 can cause the machine learning architecture to detect features including edges, corners, or textures of a boundary between the document and other image data (e.g., a countertop, table, floor, etc.). In some embodiments, the features can include features of the document itself, such as an orientation or position of text, decorative or other features (e.g., vertical or horizontal lines such as a payee line, endorsement line, or borders).

In some embodiment, the execution of the computer vision engine 206 can cause the machine learning architecture to apply an edge detection algorithm to detect an edge of a paper document, a thresholding algorithm to segment the document (or portions thereof) from the background, a contour detection algorithm, or so forth. Where the edges of the document are identified, a boundary box can bound the document from the background.

In some embodiments (e.g., as depicted hereinafter at FIG. 4C) the execution of the computer vision engine 206 may cause the machine learning architecture to determine a bounding box relative to an orientation of image data of the video feed (e.g., a rectangular boundary box having edges aligned with rows and columns of the image data). In some embodiments, the execution of the computer vision engine 206 can align or de-skew, or otherwise adjust an orientation of an object to match document edges, such that a bounding box can be provided with respect to a document within the image data (e.g., to generate bounding boxes having edges aligned with the edges of the documents). That is, bounding boxes can be applied as conformal boxes, such as via an application of a spatial transform of an image, or via bounding box decomposition/approximation.

The machine learning architecture of the computing device 230 includes layers and functions that are defined by or executed as software routines of the alignment engine 208. The alignment engine 208 can determine an alignment of an image. The execution of the alignment engine 208 can further provide a dynamic alignment guide responsive to the determined alignment. In some embodiments, the machine learning architecture executing the alignment engine 208 receives alignment information from another component of the computing device 230 (e.g., the computer vision engine 206). The alignment engine 208 can generate the dynamic alignment guide for inclusion in a same or different layer of an augmented image as the image generated for AR display by the computer vision engine 206.

In some embodiments, the execution of the alignment engine 208 can determine an alignment according to features extracted from image data including a document, such as a check. For example, the execution of the alignment engine 208 can identify a corner, edge, or other portion of a document according to any of the techniques referred to with respect to the object recognition engine 202 or the content extractor 210.

The machine learning architecture may execute the alignment engine 208 in coordination with the activation of the camera and present an ongoing video feed from the camera having virtualized overlays within the video feed. For instance, the graphical user interface may present a video feed of the client device 110 with an overlay of a bounding box or other alignment guide as generated or retrieved by the computing device 230. Optionally, the computing device 230 may receive still image data or stored video data and generate the overlays on the still image or video data. The user may operate the client device 110 by interacting with the graphical user interface. The computing device 230 may then generate an alignment guide. The computing device 230 can then cause to be presented, the graphical user interface including the image data and the alignment guide.

Figure 3A:
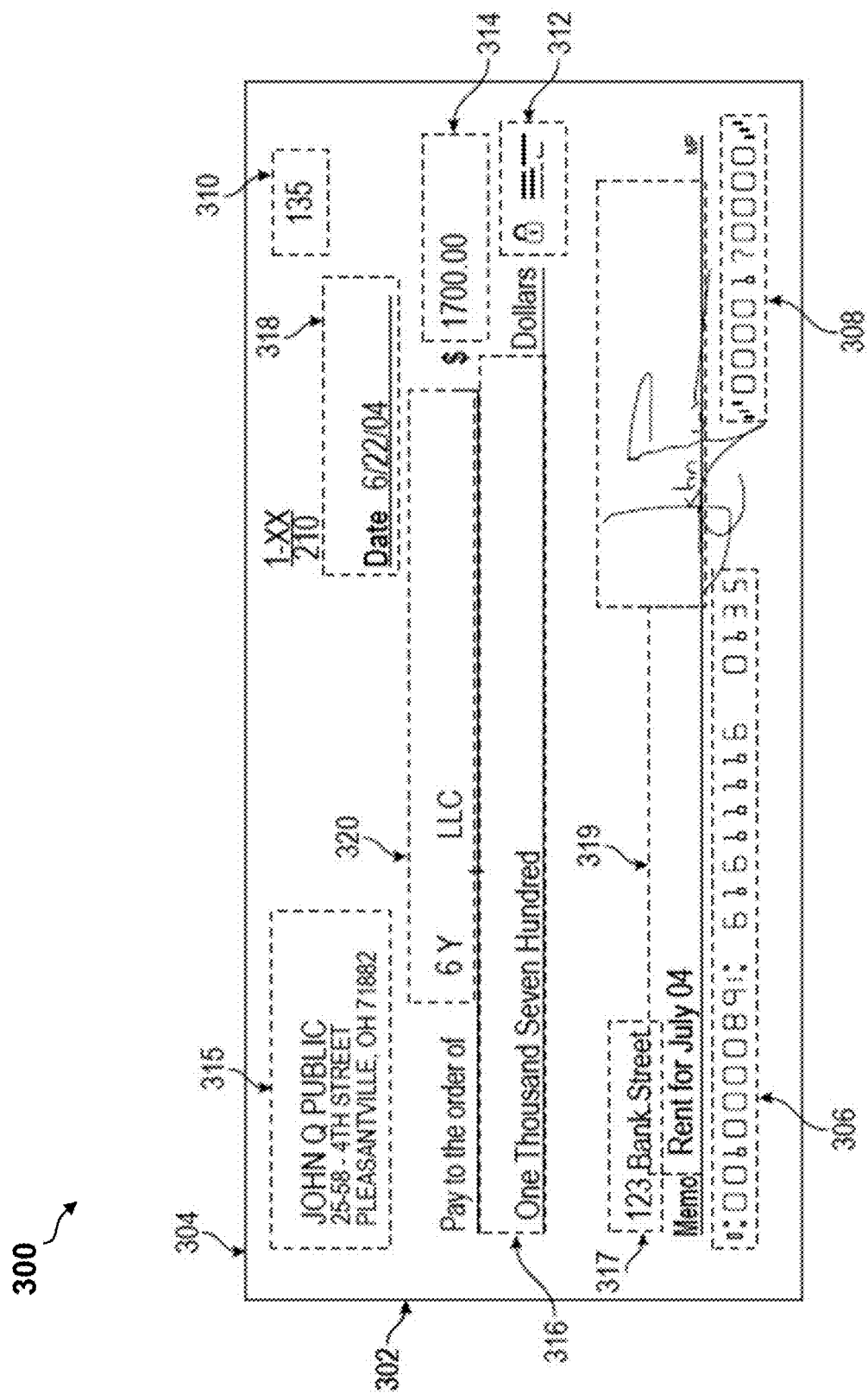
FIG. 3A depicts fields of a front of a check derived from one or more devices of the system of FIG. 1, in accordance with some embodiments.
Figure 3B:
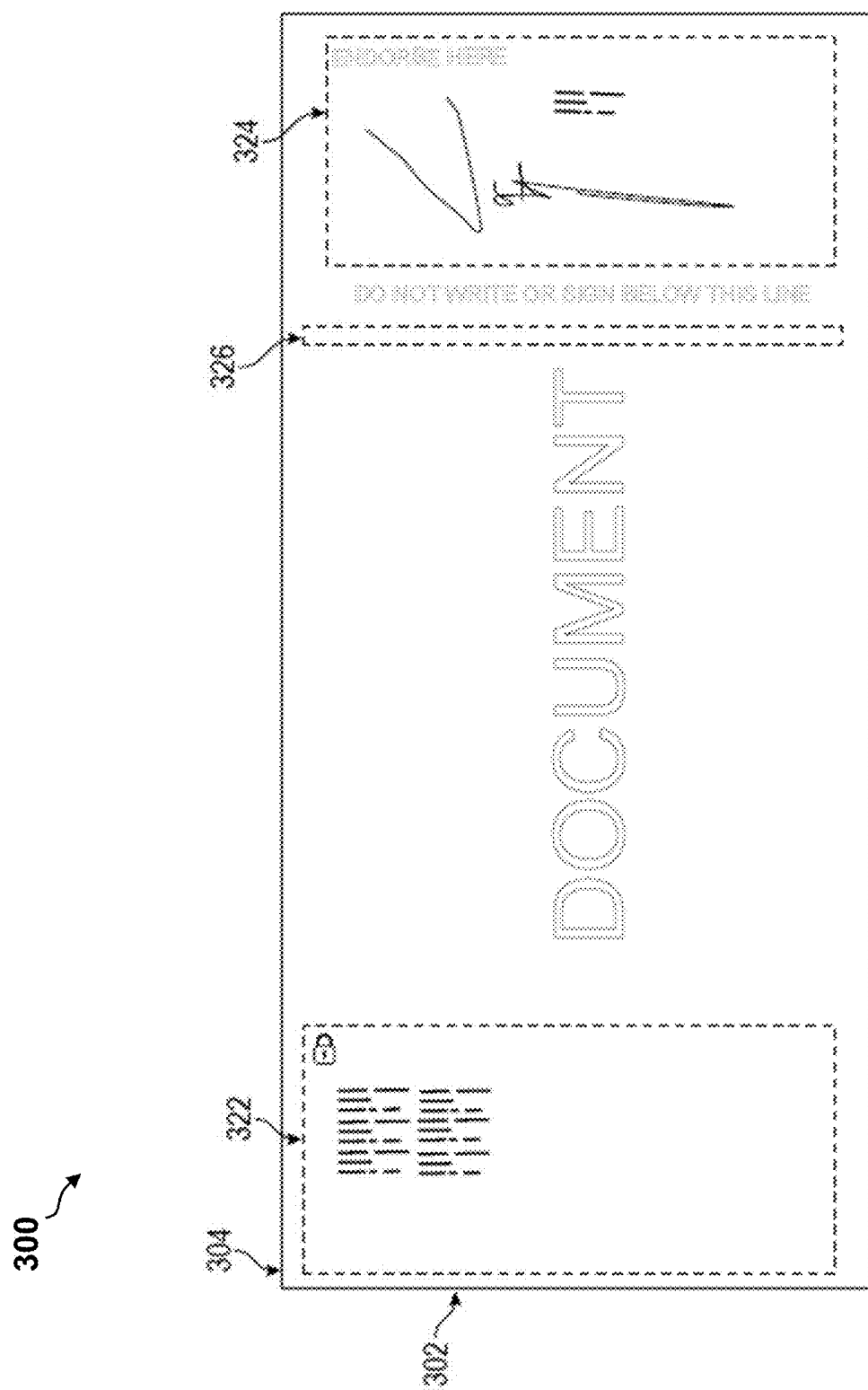
FIG. 3B depicts fields of a rear of a check derived from one or more devices of the system of FIG. 1, in accordance with some embodiments.

In some embodiments, the machine learning architecture executes the alignment engine 208 to determine a position of one or more fields of a document. For example, the execution of the alignment engine 208 can determine a position of data content such as an account or routing number field (e.g., a Magnetic Ink Character Recognition (MICR) symbol thereof) to determine whether an edge of a check is a top, bottom, left, or right side, or whether a depicted image includes an image of a front face of a check (e.g., as depicted in FIG. 3A) or a rear face of the check (e.g., as depicted in FIG. 3B). In some embodiments, the execution of the alignment engine 208 can omit an alignment guide absent a determination of check alignment. For example, the execution of the alignment engine 208 can omit provision of a portion of an overlay prior to detection of the alignment (or provide an indication of a lack of such detection, such as a prompt to capture the check or an indication that no check is detected). Although referred to as MICR fields or characters, no inference of a magnetic or other sensor particular thereto is intended. For example, the MICR field can be recognized according to optical detection alone in at least some embodiments.

The machine learning architecture can execute the alignment engine 208 to generate one or more dynamically generated alignment guides for presentation to a user. For example, the execution of the alignment engine 208 can, upon identification of an edge, corner, field, or other aspect of a check, generate an alignment guide corresponding thereto. In some embodiments, the execution of the alignment engine 208 can generate a portion of an overlay (e.g., a vertical line) corresponding to a vertical edge along the top or bottom of a check. In some embodiments, the alignment engine 208 can generate a portion of an overlay (e.g., a corner locator) corresponding to the corners of the check. In some embodiments, the alignment engine 208 can generate a field indicator indicative of one or more fields of the check. For example, the field indicator can indicate a field of the check, such as an account number field, routing number field, combination thereof, endorsement field, etc. A presentation of one or more of the dynamically generated alignment guides can be provided to a client device 110 to aid a user capturing a check. For example, the presentation may provide an indication, to a user, that the document is not detected, or provided a location of a detected object. Some illustrative examples of alignment guides are provided hereinafter, with respect to FIGS. 4A-4E.

The machine learning architecture of the computing device 230 includes layers and functions that are defined by or executed as software routines of the content extractor 210. The content extractor 210 can extract content data from image data or other received data (e.g., metadata associated with image data). For example, the content extractor 210 can extract content from bounded or unbounded image data, or from metadata (e.g., from a check, a background, or location data).

Content data can include any of the various planes of feature vectors disclosed herein. Content data can include annotated text from various fields of a document such as a check. For example, a text annotation can include a transcription of the text (e.g., via OCR), an indication of a color, font, handwritten portion or printed-ness, position relative to other fields/features, etc. Content data can further include frame-to-frame displacement of various content data. For example, incident to movement of a check, image sharpening, variations of edge detection, or so forth, a relative position may be detected to differ on a frame-to-frame basis. In some embodiments, such displacement can exceed a displacement threshold so as to indicate an anomaly.

Content data can include various features or characteristics of a check, such as a watermark, or features of typography. For example, content data associated with a manual signature (sometimes referred to as a "wet" signature) can vary from content data of a printed signature. Content data can further include location data, client device identifiers (e.g., mobile wallet identifiers), or other metadata received with or corresponding to image data.

In some embodiments, the content extractor 210 (like other feature extractors of the present disclosure) can include a decoder of a neural network of the machine learning architecture. The execution of the decoder can decode information encoded into an image according to a printing, endorsement, manipulation, or filming thereof. The execution of the decoder can cause it to operate on either of the image data itself (along with any corresponding metadata) or on a feature vector corresponding thereto. That is, in some embodiments, either of a feature extractor or an image flatten can define an input layer for the decoder. For example, the decoder can decode various image characteristics from the image as processed by a feature extractor. Such image characteristics can include labeled features of training data (e.g., an indication of digital or mechanical manipulation of a document, such as a presence of chemically sensitive ink or artifacts of digital manipulation). Such image characteristics can include unlabeled correspondence, including patterns determined from training data which are not expressed in a spatial-temporal dimension. The decoder can be a stand-alone decoder, or an encoder of an encoder-decoder pair (e.g., an autoencoder). For example, the content extractor 210 or other models herein can ingest training data (e.g., determine weights between various layers of a model) according to patterns or relationships inferred of the autoencoder.

The computing device 230 can include an image generator 212 to generate a representative image of a document of the video feed. The image generator can generate a single image from one or more frames of the image data. For example, the image generator 212 can generate an image for conveyance to a provider server. Such an image is sometimes referred to as an Image Replacement Document (IRD) or "Check 21 Image," without limiting effect.

In some embodiments, the representative image is selected according to a quality score. For example, an image having a highest quality score of the image data selector 204 can be selected as the representative image, or a precursor therefor. In some embodiments, the representative image (or a precursor therefor) is selected according to a spatial or spatial-temporal patch. For example, a patch for one or more first fields of a document can be selected from a first frame, and a patch for one or more second fields of a document can be selected from a second frame. Thus, if a check is out of focus, or somewhat out of frame, at least a portion of the information may be included in an output image generated by the content extractor.

The machine learning architecture of the computing device 230 includes layers and functions that are defined by or executed as software routines of the image generator 212. The image generator 212 can manipulate image data to generate a representative image (also referred to as an output image or packaged image, without limiting effect) in conformance with a resolution, contrast, legibility, or other aspect. In some embodiments, the representative image can include appended information, or additional metadata may be provided along therewith. The representative image may further be edited to reduce dimensionality (e.g., may be manipulated to remove color information), or reduce a file size of the image. For example, the execution of the image generator 212 can perform a denoising of the image data.

The execution of the image generator 212 can determine a fidelity metric of the generated image with regard to one or more source images. For example, the fidelity metric can depict a difference between an input as captured (e.g., according to one or more frames), and the representative image. For example, substantial denoising, text replacement or other operations to improve a quality metric of the document can reduce a fidelity to the original frame data. Such improvement may aid some aspects of a remote deposit capture scheme, but may complicate other aspects, such as document traceability, subsequent recognition, or conformance with an accord to provide an image representative of a source image (e.g., with respect to further bank or non-bank financial institutions, such as an ACH). For example, the fidelity metric can be compared to a fidelity threshold corresponding to human perceptible changes, a recognition of one or more systems, or according to an inter-party agreement as to fidelity of representative images such as the Check 21 image provision schema. In some embodiments, the fidelity threshold applies to a subset of potential image manipulations. For example, a rotational correction to an orientation or rescaling may not reduce a fidelity threshold in some embodiments.

The execution of the image generator 212 can generate an image according to the quality threshold and the fidelity threshold. A magnitude by which the quality or fidelity metric exceeds the quality or fidelity threshold, respectively, may be referred to as a margin. A positive margin thus indicates a metric which exceeds the threshold, while a negative margin indicates a metric which does not meet the threshold. In some embodiments, the image generator 212 can determine a local minimum to equalize (e.g., locally maximize) the quality and fidelity margin. For example, an image can be sharpened, de-noised, or otherwise manipulated to improve a quality margin to the detriment of a fidelity margin (or vice versa).

In some embodiments, the execution of the image generator 212 can otherwise generate an image meeting or exceeding each of the quality threshold and fidelity threshold. For example, the execution of the image generator 212 can determine a local maximum for the fidelity holding the quality to the threshold or determine a local maximum for the quality holding the fidelity to the threshold. In some embodiments, the machine learning environment can, via execution of the image generator 212, determine that an image cannot be generated which meets both of a quality and fidelity threshold, and may prompt a user to generate additional image data (e.g., via the prompt generator 216).

The machine learning architecture of the computing device 230 can includes layers and functions that are defined by or executed as software routines of the anomaly detector 214 to detect anomalous content associated with image data. The anomaly detector 214 can generate a risk score based on evidence of physical manipulation of a document digital tampering (e.g., a liveness score), or other associated data (e.g., metadata). For example, the anomaly detector 214 can detect manipulation of a document via detection of wet signatures or printed signatures or outlier deposit amounts. The anomaly detector 214 can determine a liveness score via image data indicative of digital tampering such as deepfake detection according to spatio-temporal distortions, lighting or shadow irregularities, or other detection methods of a machine learning architecture. The anomaly detector 214 can detect risk relevant metadata via comparison of a check to another check of a same drawee bank associated with high incidents of fraud, a GPS location, a check number which matches a check number which has already been deposited, or other information retrieved from an analytics database 140.

The execution of the anomaly detector 214 can detect anomalies based on content of the image data or associated data (e.g., metadata) such as location data. Although the execution of the anomaly detector 214 can detect any of the anomalies, risk indicia (e.g., risk scores), or so forth described herein, such examples are not intended to be limiting. Indeed, the anomaly detector 214 can detect various patterns in any of the data of the data repository 150, even where those indicia are not explicitly provided (e.g., labeled) as corresponding to an anomaly or risk. For example, at least one model of the anomaly detector 214 can include a model trained on labeled data of the data repository 150. For example, the training data can include checks exhibiting anomalies such as illegible or mis-transcribed characters, outlier amounts, typographic errors, mis-sequenced check numbers, or manipulation. The execution of the anomaly detector 214 including the trained models can detect further anomalies according to the training. Such anomaly detection can include binary indications of anomalous/non-anomalous, an anomaly risk score, or a classification according to any of the classifiers provided herein.

The anomaly detector 214 can generate a liveness or risk score based on any of the information received or identified in the document. In some implementations, the anomaly detector 214 may determine the liveness or risk score based upon determining or computing a level of variation or similarity between attributes of the document amongst various frames of the video data. For instance, the anomaly detector 214 may generate the liveness or risk score based upon the information derived from the frames of the image data and compare the information of these frames to determine the frame-to-frame variation or similarities of the document, which may include identifying and comparing attributes of the document (e.g., visual characteristics of a check), metadata associated with the document or the image data (e.g., location data of the user device streaming the video data), and/or content data representing various types of content recognized by the server in the document (e.g., name of a bank for a check document; name of the bank customer listed on the check). As an example, the server may recognize and compare numeric or textual values (e.g., a text string indicating a name of a bank) in the image data of consecutive frames of the video data.

In some cases, the anomaly detector 214 may determine the liveness or risk score based upon identifying and comparing attributes of the document (e.g., visual characteristics of a check), metadata associated with the document or the image data (e.g., location data of the user device streaming the video data), and/or content data representing various types of content recognized by the server in the document (e.g., name of a bank for a check document; name of the bank customer listed on the check) against data records for similar documents having known or likely incidents of fraud.

As indicated above with regard to the object recognition engine 202, such anomalies can be detected according to the data of a single frame. For example, the machine learning architecture can execute the anomaly detector 214 to detect an anomaly within a frame of an image. Such anomalies can include, for example, irregular character spacing, visual artifacts evident of digital or mechanical manipulation (e.g., voids in a watermark), a printed signature for a bank or drawee typically associated with a wet signature, or so forth. Indeed, the detection of the anomaly may be with regard to any dimension of a hyperplane.

In some embodiments, as indicated above with regard to the object recognition engine 202, such anomalies can be detected according to the multi-frame data which can include spatial-temporal patching or full video data. For example, the anomalies can be detected according to frame-to-frame variances in content data or physical locations/dimensions, judder, irregular movements, or so forth, in addition to any of the techniques described with regard to a single frame. Indeed, multi-frame data may be employed to increase confidence of a single frame analysis.

In some embodiments, the anomalies can be detected with further regard to other than image data, such as metadata associated with a video feed. For example, execution of the anomaly detector 214 can cause an ingestion of location data which may, for example, match an area associated with high rates or fraud, appear to be spoofed, not match an expected location for a user, or otherwise indicate an anomalous transaction. In another example, execution of the anomaly detector 214 can cause an ingestion of deposit account data which may, for example, deviate from typical amounts or relationships between a drawee and drawer of a check.

The machine learning environment of the computing device 230 can include layers and functions that are defined by or executed as software routines of the prompt generator 216 to provide cues to a user, via the user interface. For example, the execution of the prompt generator 216 can generate a prompt to a user to provide a response via the user interface, or take another action, such as adjust video capture of a document or execute further communication. The various prompts of the prompt generator 216 can be conveyed from the server to the client device 110 for presentation via the user interface. The prompt generator 216 can generate the prompts for inclusion in a same or different layer of an augmented image as the image generated for AR display by the computer vision engine 206 or the alignment engine 208.

The machine learning environment can execute the prompt generator 216 to prompt a user to adjust an orientation of a camera associated with the client device, or a position of a document. For example, a corresponding prompt can include an indication that a document is not detected, not legible, that a camera is obscured, that the camera should be closer to or further from the document, and so forth. Some prompts associated with the prompt generator can be related to or coextensive with alignment guides of the alignment engine 208, bounding boxes of the computer vision engine 206, or other aspects of the present disclosure. For example, subsequent to an elapsed time wherein the bounding box is not generated (or is generated according to a confidence interval less than a corresponding threshold), or for which a dynamic alignment indicator is not provided, the prompt generator 216 can provide a prompt including instructions to capture the check in the video feed. In some embodiments, the instructions are based on the video feed, such as an indication that the image data is too dark, out of focus, unable to attach to a camera driver, or so forth.

The machine learning environment can execute the prompt generator 216 to prompt a user to provide additional input information via the video feed. For example, the machine learning environment can determine, via execution of the anomaly detection engine 214, that a potential anomaly exists with regard to one or more fields (e.g., a mis-transcribed digit, or an anomaly related to a deposit amount, security feature, or the like). The prompt generator 216 can generate a prompt to request additional video data of such an element (e.g., a zoomed-in or expanded view of one or more blurred fields of a check). In some embodiments, the execution the prompt generator 216 can generate prompts for other information such as a request to include a driver's license or other identification into a same or separate video feed, a request to change an orientation of a document (e.g., to flip over a check), a request to include biometric information such as to provide a face or thumb in a video feed (or via another sensor of the mobile device, such as a thumb-print reader associated with the mobile wallet).

The machine learning environment can execute the prompt generator 216 to prompt a user to provide authentication data via the client device 110. For example, a prompt can prompt a user to enter a pin or other identity number, passphrase/challenge phrase, or other verification. In some embodiments, such verification can include out of band communication such as 2FA, or by initiating a telephone call with a representative. The machine learning environment can execute the prompt generator 216 to prompt another device in network communication with the computing device 230 to perform an action. For example, the actions can include a deposit, placing a hold or fraud alert on an account, or so forth.

FIG. 3A depicts fields of a front of a check 300 derived from one or more devices of the system 100 of FIG. 1, in accordance with some embodiments. The depicted check 300 is not intended to be limiting; corresponding fields of various documents may be identified according to the present disclosure. The check 300 may be defined according to a boundary including an edge 302 between the check and a background of an image. Edges 302 can intersect at corners 304, which may be identified according to the intersection of the corners, or features corresponding thereto (e.g., according to a corner response function, gradient calculation, or the like). Either of the edges 302 or the corners 304 can be detected according to the execution of the object recognition engine 202 or the computer vision engine 206. Fields can correspond to any of the content of the fields provided herein (e.g., as extracted by the machine learning architecture executing the content extractor 210).

A MICR line 306 can include various data fields such as an account number, a routing number, a check number, or other check information. In some embodiments, the MICR line 306 can include multiple fields, such as wherein an execution of a content extractor 210 can determine a separate field (e.g., a check number field, routing number field, or check number field). For example, the execution of the content extractor 210 can include an employment of OCR or aspects of an object recognition engine 202 to detect MICR delimiting characters. Further, fields can include an auxiliary field 308 for MICR information such as an "on-us" internal field (e.g., a field indicating a specific type of account or an instruction for how the check should be processed). A check number field 310 can provide an indication of a sequence of a check. For example, a check number field 310 can correspond to a sequence of a check in a physical booklet or an electronic sequence, wherein other instances of check number associated with the drawee are stored in the data repository.

A security indica field 312 can provide an indication of a security device of the check. For example, the security device can include a watermark, microprinting, security threads, color shifting ink, chemical sensitivity, fibers or planchettes, hologram, void pantograph, and so on. Some security features can be detected according to an execution of a content extractor 210, whereupon further content data of the check 300 can depend upon the detected security features. For example, frame-to-frame variation corresponding to a hologram may be indicative of a lack of an anomaly, wherein frame-to-frame variation corresponding to a lack of a hologram may be indicative of an anomaly.

A numerical amount field 314 includes a deposit amount. A written amount field 316 also includes the deposit amount. The systems and methods herein can verify a correlation between the numerical amount field 314 and the written amount field 316 (or further data, such as an entered deposit amount). The systems and methods herein can further compare other such fields, such as between the check number of the check number field 310 and the check number of the MICR line 306, or a security feature and a check source. Further fields can include a drawee address field 315, memo field 317, date field 318, institution address field 319, or drawer identity field 320.

Some fields can include pre-printed or handwritten text. Particularly, the MICR line 306, auxiliary field 308, check number field 310, and at least some aspects of the security indicia field 312 are depicted as preprinted, whereas other fields, such as amount fields (e.g., the numerical amount field 314 and written amount field 316) can include handwritten content. The machine learning architecture can execute the content extractor 210 to extract the textual content of the fields as well as further data content such as the indica of printed of handwritten text. Some fields can omit textual content (e.g., a signature).

FIG. 3B depicts fields of a rear of a check 300 derived from one or more devices of the system 100 of FIG. 1, in accordance with some embodiments. Particularly, fields of a rear of the check 300 can include security information 322 or other data such as institution contact information, which may by correlated to a check design or an inclusion of one or more security features. The rear facing further includes an endorsement area 324 demarcated by a demarcation line 326.

Figure 4A:
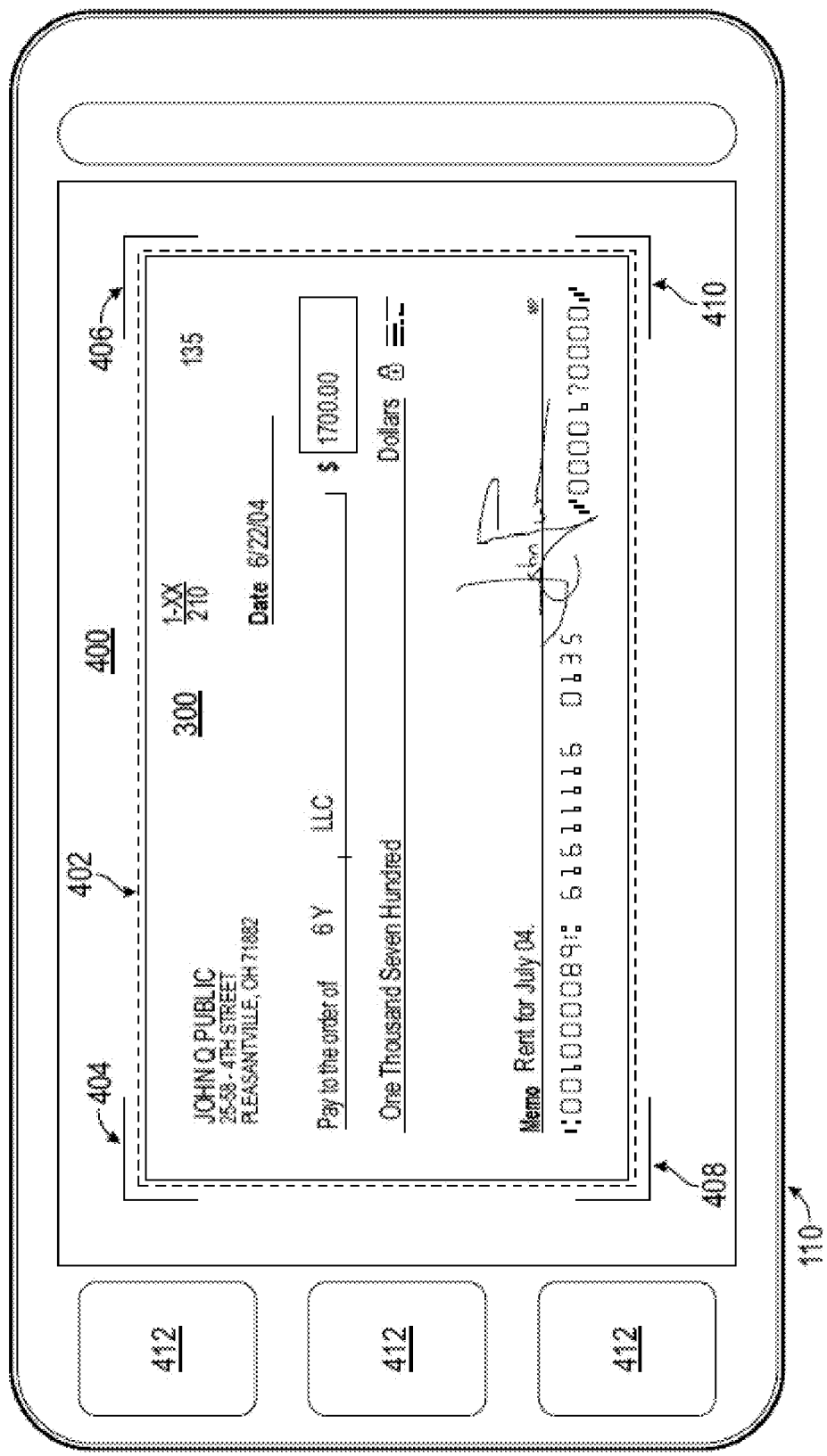
FIGS. 4A-4C depict example overlays of a client device presenting a graphical user interface including a check, in accordance with some embodiments.

FIG. 4A depicts an overlay of a client device 110 presenting a graphical user interface 400 including a check, in accordance with some embodiments. As depicted, the graphical user interface 400 presents icons corresponding to the check 300. A bounding box 402 bounds the check from a background captured by the camera and depicted in the graphical user interface 400. The depicted bounding box 402 is a rectangular bounding box 402 defined according to vertices thereof. An outline of the bounding box 402 can vary according to a confidence corresponding thereto. Such an outline can include a dashed line as shown, or a solid line, double line, thicker line, etc. In some embodiments, the outline or other indication of the bounding box 402 can include a color, textual cue, or so forth. For example, the body of the check 300 can be highlighted in green, the background can be covered in a cross-hatched pattern, etc. The depiction of the graphical user interface does not necessarily correspond to a video feed conveyed to a computing device 230. For example, the graphical user interface can include a subset of image data to aid a user to capture content data of the check 300, while additional information can be provided to the computing device 230 (e.g., to include the background information). Moreover, the overlay or bounding box data may not be conveyed to the computing device 230. Indeed, in many embodiments, such elements are received from the server for presentation by the client device 110.

As depicted, a first dynamic alignment indicator 404 corresponds to a first vertex of the bounding box 402. A second dynamic alignment indicator 406 corresponds to a second vertex of the bounding box 402. A third dynamic alignment indicator 408 corresponds to a third vertex of the bounding box 402. A fourth dynamic alignment indicator 410 corresponds to a fourth vertex of the bounding box 402. The depicted dynamic alignment indicators are not intended to be limiting, various such indicators may be employed according to various embodiment of the present disclosure (e.g., closed indicators, overlayed over or concentric with the bounding box, an indicator for one or more fields or characters of the check 300, etc.).

One or more control elements 412 of the user interface are depicted as buttons. Further control elements 412 can include, for example, a mouse or keyboard or a touchscreen of the client device 110. The control elements 412 can provide responses to prompts or otherwise convey information from a user to the computing device 230.

Figure 4B:
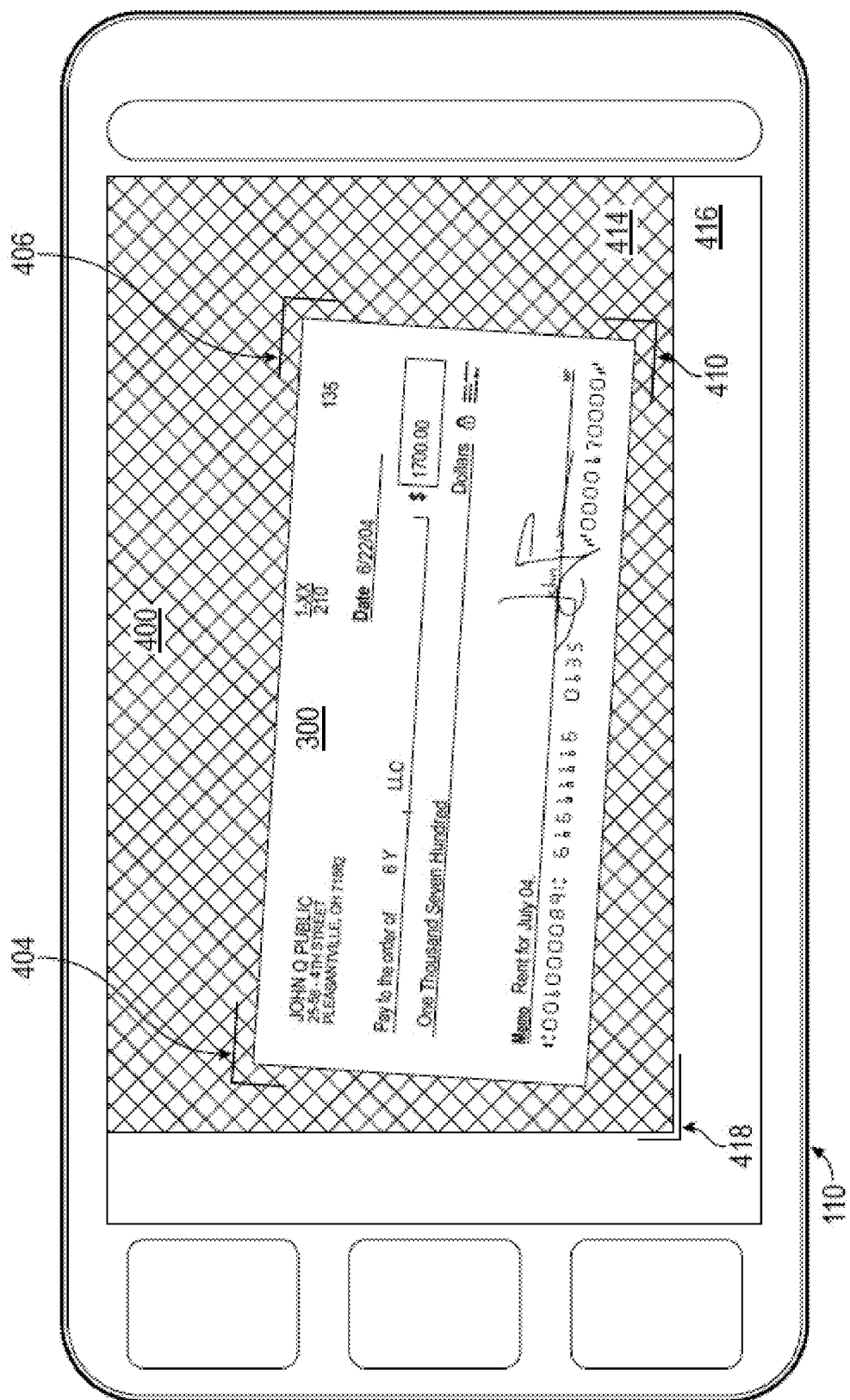

Referring now to FIG. 4B, another overlay of a client device 110 presenting a graphical user interface 400 associated with a check 300 is provided in accordance with some embodiments. As depicted, the check 300 is provided along with a background including a first zone 414 (e.g., a countertop) and a second zone 416 (e.g., a floor). As shown in FIG. 4B, a bounding box 402 is omitted from the graphical user interface 400 of the depicted embodiment.

As depicted, each of the first dynamic alignment indicator 404, second dynamic alignment indicator 406, and fourth dynamic alignment indicator 410 are shown along with the check 300 according to a skew angle of the check 300 relative to the user device 110. However, a fifth dynamic alignment indicator 418 is shown as conforming to a corner of the first zone 414 rather than to the corner of the check 300 or bounding box 402. Such a display may prompt a user to adjust a focus, check location, or otherwise revise the orientation of the video feed. However, in some embodiments, the systems and methods herein can tolerate substantial skew or misalignment.

Figure 4C:
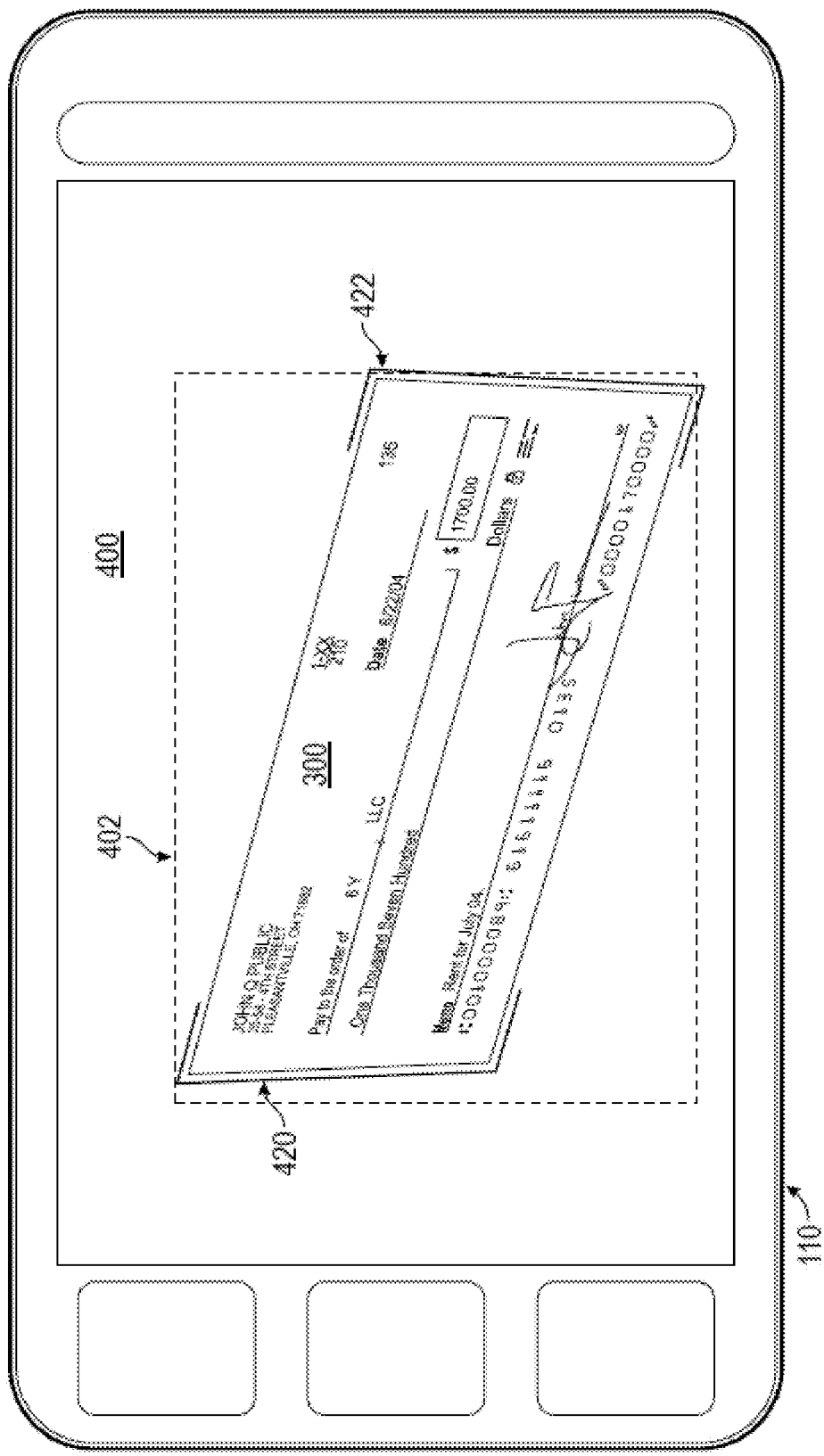

Referring now to FIG. 4C, yet another overlay of a client device 110 presenting a graphical user interface 400 associated with a check 300 is provided in accordance with some embodiments. As is depicted, a sixth dynamic alignment indicator 420 and seventh dynamic alignment indicator 420 define a left and right portion of the check 300, according to edges or vertices of the check (e.g., edges 302 or vertices 304 of the check 300 in FIGS. 3A-3B). In some embodiments, such dynamic alignment indicators 420, 422 can be provided based on either of the check fields or the bounding box 402 (e.g., bounded by an area defined by the bounding box 402).

As is further depicted, a bounding box 402 is defined according to the image as provided in the feed. As indicated above, in some embodiments, the machine learning architecture can execute a computer vision engine 206 to generate a bounding box 402 relative to a transform (e.g., a spatial transform such as to align the check as depicted in FIG. 4A). In such an embodiment, the bounding box 402 may appear, like the dynamic alignment indicators, to conform to the check.

Figure 4D:
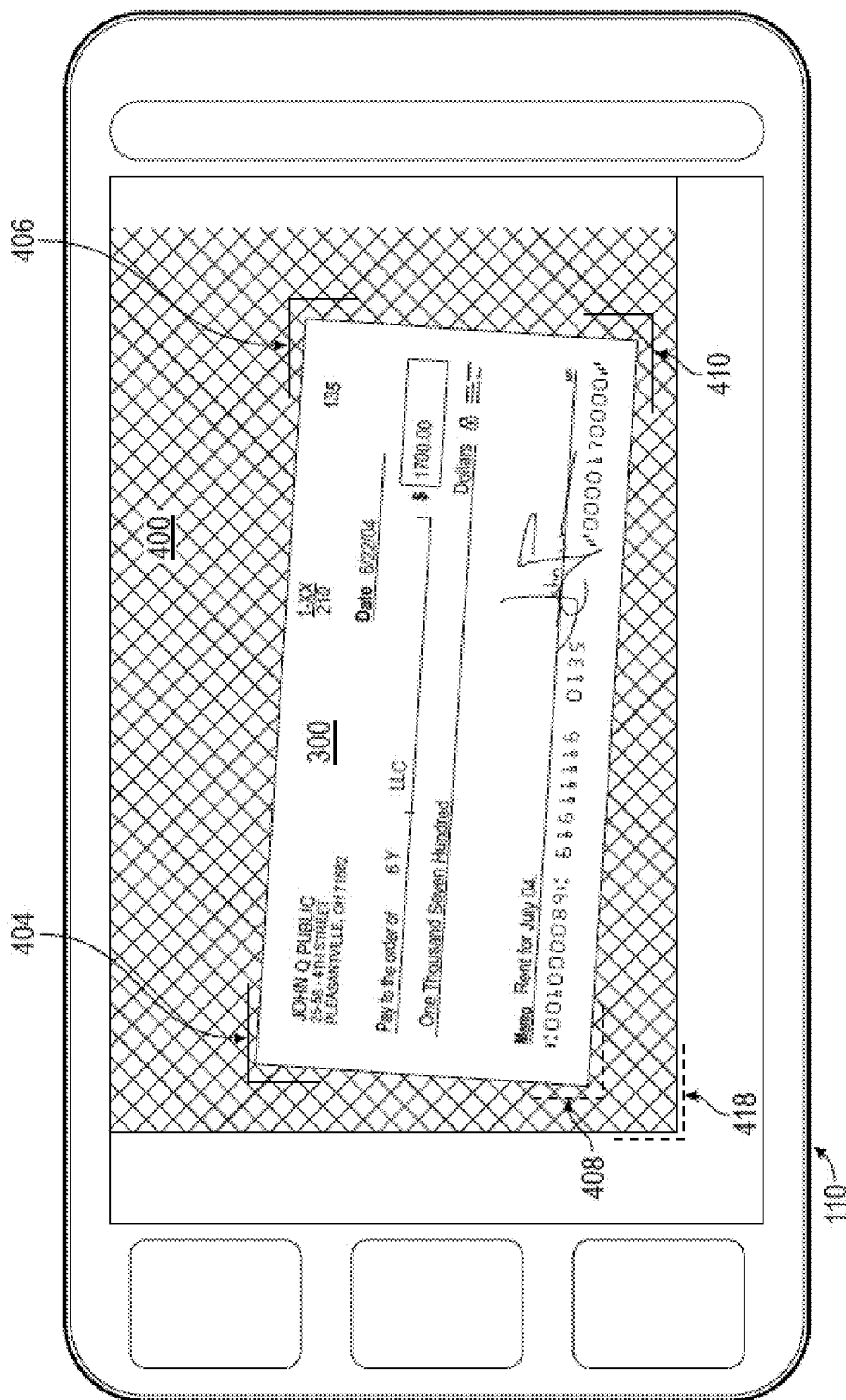
FIG. 4D depicts another overlay still of a client device presenting a graphical user interface associated with a check, in accordance with some embodiments.

FIG. 4D depicts another overlay still of a client device 110 presenting a graphical user interface 400 associated with a check 300, in accordance with some embodiments. The graphical user interface 400 is similar to the graphical user interface 400 of FIG. 4B, however, the presently depicted graphical user interface 400 depicts a prompt related to the dynamic alignment indicators. Particularly, the depicted graphical user interface 400 displays each of a third dynamic alignment indicator 408 and a fifth dynamic alignment indicator 418. As shown, the icons of the respective dynamic alignment indicators are shown with a decreased prominence corresponding to a confidence interval therefor. Such a depiction may prompt a user to select one of the depicted dynamic alignment indicators 408, 418. In some embodiments, the display can include explicit instructions to select a dynamic alignment indicator 408, 418, or the graphical user interface can elevate the prominence (e.g., by blinking or distinguishing color) to prompt the user to make the selection.

Figure 4E:
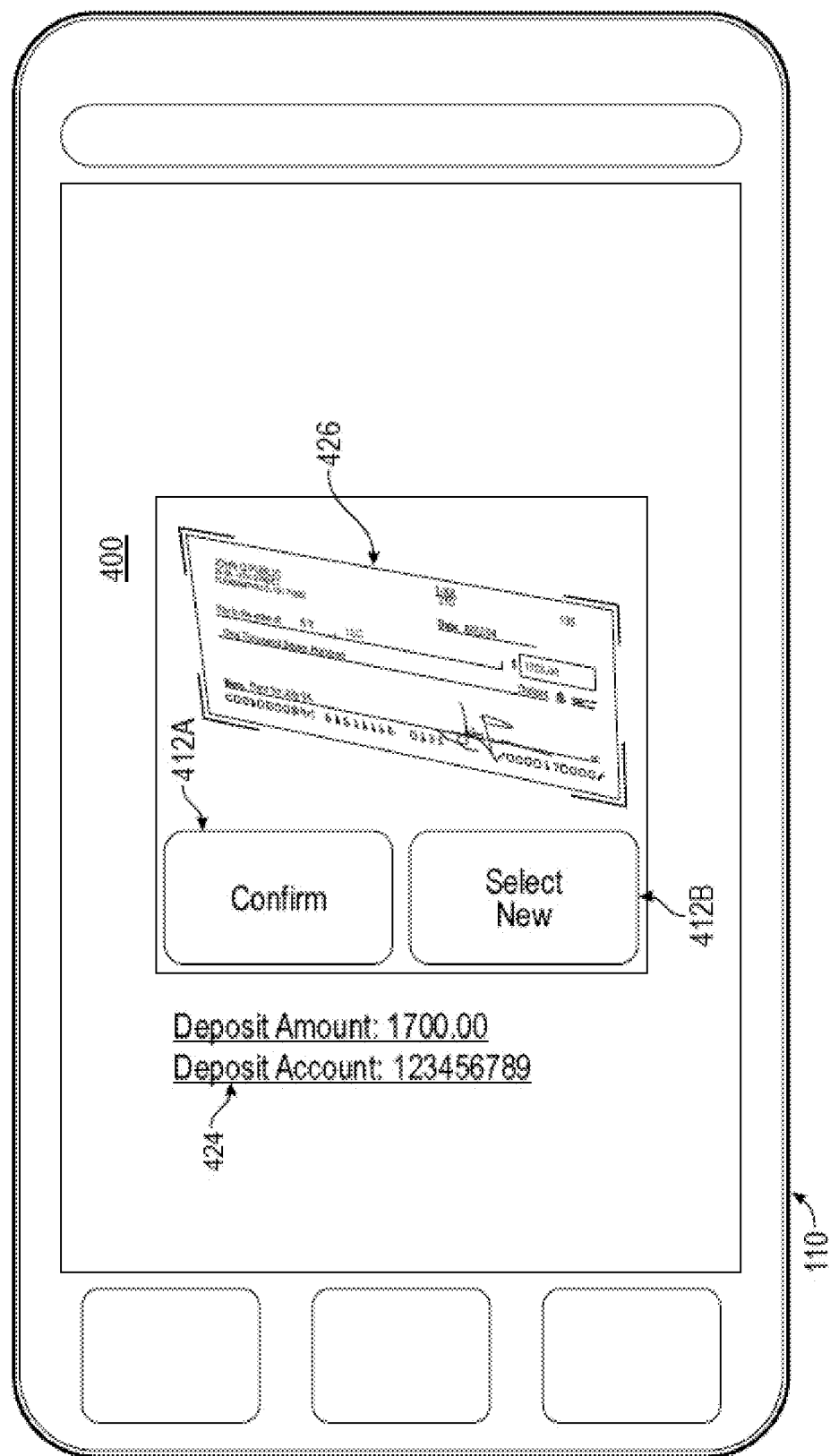
FIG. 4E depicts a further overlay of a client device presenting a graphical user interface associated with a check, in accordance with some embodiments.

FIG. 4E depicts a further overlay of a client device 110 presenting a graphical user interface 400 associated with a check 300, in accordance with some embodiments. The graphical user interface 400 provides an explicit prompt having a first control element 412A and second control element 412B corresponding thereto. The prompt further provides confirmatory content data 424 of the check. In some embodiments, the confirmatory content data 424 is entered manually by the user (e.g., via a keypad). In some embodiments, the confirmatory content data 424 use automatically generated based on the content data (e.g., via OCR). The user interface further includes a representative image 426 of the check 300, as further accompanied by dynamic alignment indicators which may, in other embodiments, be omitted.

Figure 5:
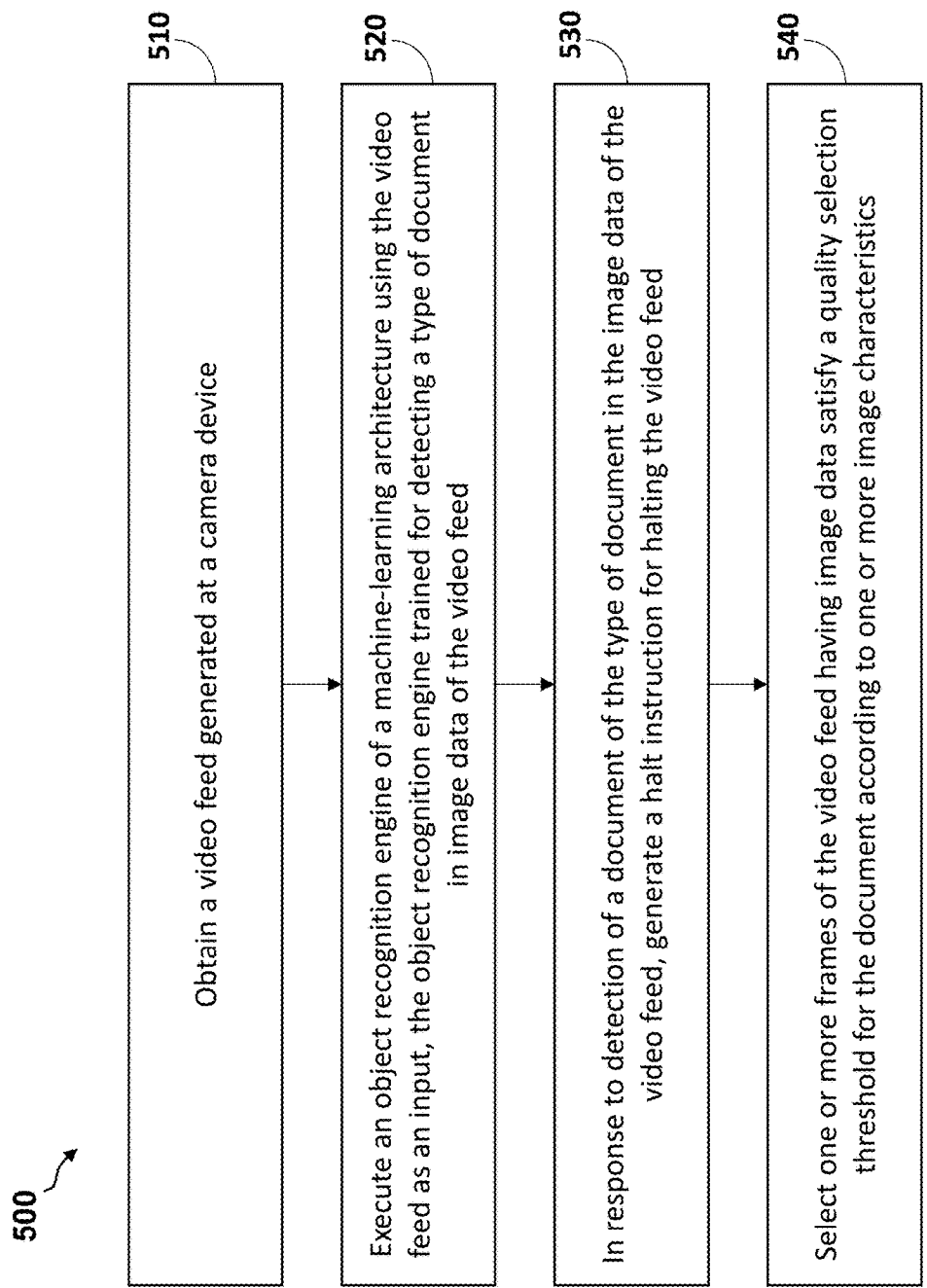
FIG. 5 is a flowchart illustrating operations of a method for capturing document imagery from a video feed, in accordance with some embodiments.

FIG. 5 is a flowchart illustrating operations of a method 500 for capturing document imagery from a video feed, in accordance with some embodiments. The method 500 may include more or fewer operations than shown. The operations shown may be performed in the order shown, in a different order, or concurrently. Operations of the method 500 are described as executed by the computing device 230. However, such a description is illustrative and non-limiting. For example, operations of the present method 500 may be performed by a single one of the computing device 230 or the client device 110 of FIG. 1, or a combination thereof.

At operation 510, the computing device 230 obtains a video feed from a camera device. For example, the camera device can be a client device 110 in network communication with the computing device 230. The video feed can include a video data stream providing contemporaneous video data, or a conveyance of a saved video file. The camera device can be a mobile device such as a cellular telephone which further includes a mobile wallet application and one or more transceivers (e.g., Wi-Fi, cellular, etc.). The mobile wallet application can establish the video feed from a same device as the camera.

At operation 520, the computing device 230 executes an object recognition engine 202 of a machine learning architecture using the video feed as an input. The object recognition engine 202 can include a model trained for detecting a type of object in a video feed. For example, for a mobile check deposit, the computing device 230 can execute a machine learning architecture to train the object recognition engine 202 to recognize a presence, absence, or other feature of a check. The computing device 230 can execute the trained model of the object recognition engine 202 to detect the object.

The machine learning architecture of the computing device 230 generate a label annotation indicating the document as detected in the image data of the frames using object recognition engine 202. For example, the server can append or otherwise associate an annotation string or other annotation to an image (e.g., a predefined bit position in metadata for the image data). In some cases, other operations of the present method 500, or other aspects of the present disclosure, can access the annotation (e.g., to reduce a number of processed frames by omitting OCR of images that do not include a document). For example, the computing device 230 can generate a label annotation indicating the presence of the front facing of the check 300. In some embodiments, the object recognition engine 202 or other computing device 230 component can generate a label annotation including a confidence score indicating a probability that the document is the type of document as detected in the image data. For example, the object recognition engine 202 can determine that the object is a front facing of the check 300 with 95% confidence and provide the determination to further components of the computing device 230 (e.g., the anomaly detection engine 214).

The object recognition engine 202 can recognize objects in all or a set of the frames of the video feed (e.g., periodic interval, random sampling, etc.). For example, the object recognition engine 202 can generate any of the label annotations for all frames of a video feed, or another set of the frames. The sets of frames can include sequential or non-sequential frames. Moreover, the object recognition engine 202 can perform a similarity score for a set of frames. For example, the object recognition engine 202 can compare a similarity between sequential or other frames. The similarity score may be employed, for example, to detect anomalies between subsequent or non-subsequent frames, determine a quality relative to a reference, or reduce a number of frames that are analyzed (e.g., the system can determine that a second frame includes a document, wherein a first frame contains the document, and the frames exhibit similarity is excess of a similarity threshold).

At operation 530, the computing device 230 generates of a halt instruction for halting the video feed. The computing device 230 can generate the halt instruction incident to a detection of the type of document in the image data of the video feed. In some embodiments, the computing device 230 generates the halt instruction in response to a first detection of a frame (e.g., upon detection of a single frame). In some embodiments, the computing device 230 generates the halt instruction in response to another number of frames, such as fifty frames, one-hundred frames, or so forth. The halt instruction can be generated according to a predetermined offset (e.g., ten seconds or five-hundred frames), the computing device 230 may generate or implement a halt instruction in response to a halt indication generated by either of a client device 110 or the computing device 230.

The halt instruction can include an instruction to halt the capturing, conveyance, or processing of video frames, according to various embodiments. For example, in some embodiments, the computing device 230 generates of the halt instruction remote from the camera device to cause the camera device to halt transmission (e.g., the server can transmit a halt instruction to the camera device). The generation of the halt instruction may be generated locally at the camera device to halt video capture. The generation of the halt instruction may be generated locally at a computing device 230 (e.g., to halt frame processing of a video file or stream).

At operation 540, the computing device 230 can select one or more frames of the video according to one or more image characteristics. The computing device 230 can select the one or more frames based on a comparison of the image data to a threshold. For example, the computing device 230 can select the one or more frames incident to the image data satisfying a quality selection threshold.

In some embodiments, the computing device 230 selects a frame with a highest quality metric, or a first frame determined to exceed a quality selection threshold. For example, the computing device 230 can determine a quality score for every frame. The quality selection threshold can relate to a clarity, orientation, lighting, or other aspect of an image. For example, the computing device 230 can select the image according to any of the techniques described herein with regard to the image data selector 204, or image generator 212.

In some embodiments, the computing device 230 determines the quality score based on a similarity to a reference. For example, the computing device 230 can execute the content extractor 210 or other feature extraction model to generate a feature vector corresponding to image quality for comparison to a reference feature vector. The computing device 230 can generate a feature vector for the image of reduced dimensionality, relative to a full image vector. For example, the feature vector may occupy a reduced subset of dimensions of a hyperplane such that similarity is indicative of image clarity or other aspects of quality but may be less indicative of other image features. The computing device 230 can include other image data from the video feed, or other sources in the reference image or feature vector. For example, the reference image can be sourced from a same device at a different time, or from a different device at a different time. In some embodiments, the reference may be a based on composite of multiple images (and their corresponding feature vectors), such as images which are not received from the camera device (e.g., are received from other devices or provider server 112, such as manually tagged images of known quality).

The depicted operations provided herein are not intended to be limiting. Operations can be added, modified, substituted, or omitted. For example, in some embodiments, the method may further include a generation of a representative image (sometimes referred to as an output image or packaged image). For example, the representative image may provide a data record, or allow further devices or systems (e.g., a drawee bank) to receive a transaction record.

In some embodiments, the machine learning architecture can execute an image generator 212 to generate a representative image based on the selected image data. The image generator 212 can generate a representative image via selection of one or more images from the image data. The image generator 212 can generate a representative image by manipulating (e.g., enhancing) the image. The image generator 212 can generate a composite of multiple frames of the image data as the representative image. In some embodiments, the image generator 212 can assemble the representative image from patches of multiple frames. For example, a left side of a check may exceed a quality threshold in a first frame, and a right side of a check may exceed the quality threshold in a second frame. The image generator 212 can combine the frames to yield the representative image.

Figure 6:
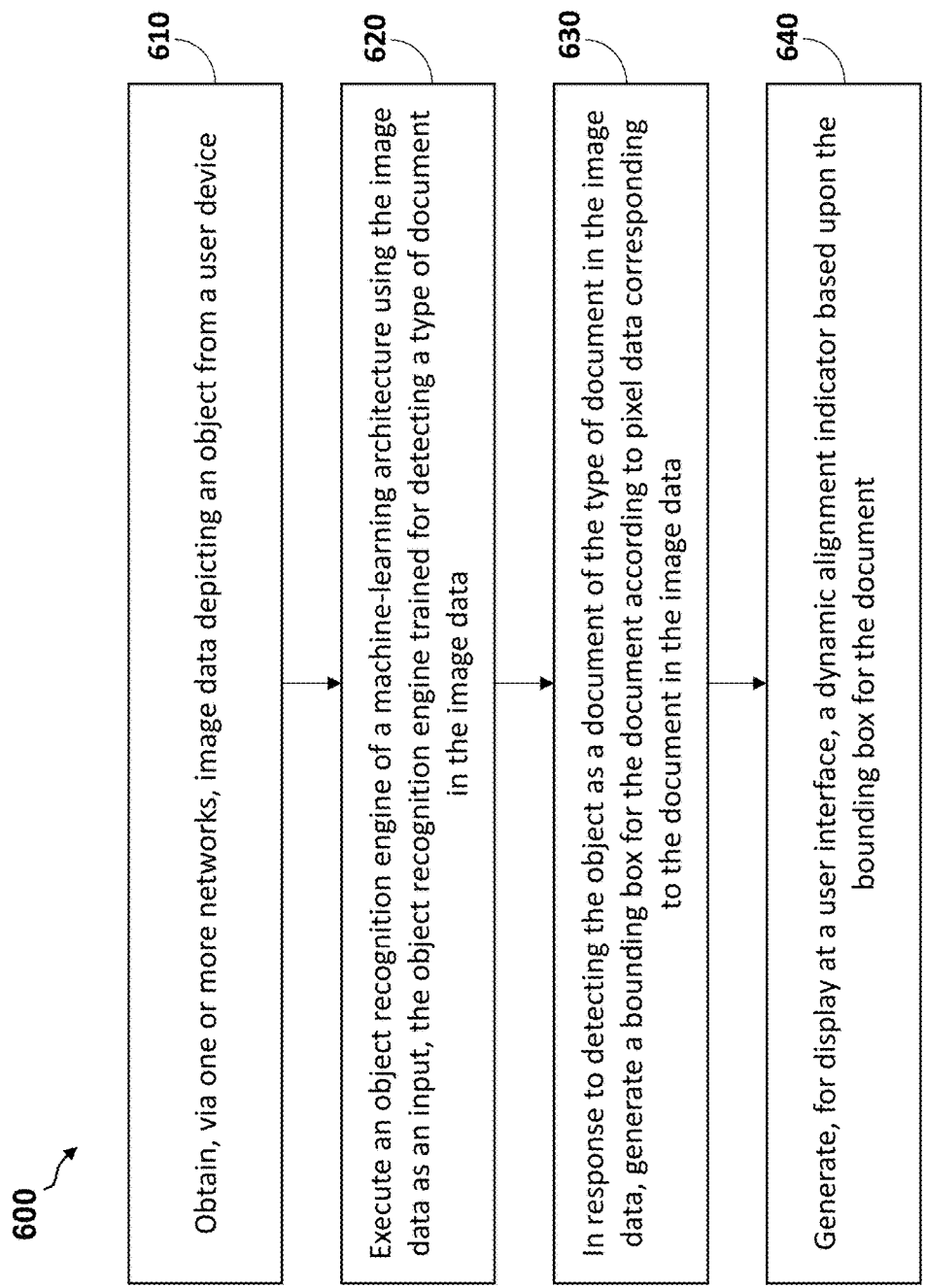
FIG. 6 is a flowchart illustrating operations of a method for capturing document imagery using object recognition bounding boxes, in accordance with some embodiments.

FIG. 6 is a flowchart illustrating operations of a method 600 for capturing document imagery using object recognition bounding boxes, in accordance with some embodiments. The method 600 may include more or fewer operations than shown according to various embodiments. The operations shown may be performed in the order shown, in a different order, or concurrently. Operations of the method 600 are described as executed by the computing device 230. However, such a description is illustrative and non-limiting. For example, operations of the present method 600 may be performed by a single one of the computing device 230 or the client device 110 of FIG. 1, or a combination thereof.

At operation 610, the computing device 230 obtains image data depicting an object from a user device. The user device can include a mobile device (e.g., a client device 110) having a camera integral thereto, or otherwise be in network communication with a source of the image data. The computing device 230 can obtain the image data via a video feed from a mobile phone, tablet, or other computing device. The computing device 230 can receive the image data as a compressed or uncompressed video stream. For example, the compression can include uniform fixed rule-based video compression (e.g., according to an MPEG or AV1 codec), or feature based compression (e.g., de-noising, feature reduction, etc.).

At operation 620, the computing device 230 executes an object recognition engine, using the image data as an input. The computing device 230 can cause the object recognition engine 202 can be trained to detect a document type in the image data. For example, the document type can include a financial instrument such as a check, wherein the execution of the object recognition engine 202 can determine a presence or absence of the financial instrument, determine a financial instrument type or determine a view of the financial instrument (e.g., a front facing or rear facing thereof). Instances of the object recognition engine 202 can include any of the recitations provided herein, such as the recitations provided with regard to operation 520 of the method 500 depicted in FIG. 5. The computing device 230 can execute the trained model to detect a document type.

At operation 630, the computing device 230 generates annotation data corresponding to a bounding box 402 for the document according to pixel data corresponding to the document in the image data. Such generation may be in response to the detection of the object at operation 620 of the present method 600. The bounding box 402 may be generated according to a library accessible to the user device or the computing device 230, such as the illustrative examples of VisionKit®, Machine Learning Kit (MLKit®), or other implementations of a bounding box generator. For example, the computing device 230 can locally execute a computer vision engine 206 to define a bounding box 402 or cause a provider server 112 to execute the computer vision engine 206 and return an indication of a bounding box 402 (e.g., vertices thereof). The computing device 230 can determine the bounding box 402 remotely from the user device, and transmit bounding box information (e.g., vertices) to the user device.

The transmitted information can be provided for display via the user device (e.g., as a layer of an augmented image), as referred to above, with regard to FIGS. 4A-4E. Upon a receipt of such bounding box data, the user device can present the bounding box 402 over the image (e.g., by including the bounding box 402 in an overlay). In some embodiments, the computer vision engine 206 can generate a confidence score corresponding to the bounding box 402 (e.g., for each vertex or combination thereof, such as edges or boxes). The computing device 230 (or the user device) can cause to be generated, according to the confidence score, a varied prominence (e.g., color, thickness, line pattern, etc.) of the depiction of the bounding box 402. For example, a first confidence interval can correspond to a first prominence (e.g., green or solid double lines to correspond to high confidence). A second confidence interval can correspond to a second prominence (e.g., yellow or solid single lines to correspond to moderate confidence). A third confidence interval can correspond to a third prominence (e.g., red or dashed lines to correspond to low confidence).

The computing device 230 can receive, from the user interface, an indication of a location of the bounding box 402 or other image characteristics. For example, the computing device 230 can receive an indication of various overlay elements or other aspects of image data such as the document centroid, fields, boundaries, alignment indicators, and so forth. The indication can include (for any element, but with particular reference to the bounding box 402), a user selection of a control element 412 to select a depicted bounding box 402 from multiple displayed options, or another user input, such as a selection of a centroid of the check 300 or an outline thereof (e.g., according to a selection or tracing of a touchscreen or other cursor).

At operation 640, the computing device 230 generates a dynamic alignment indicator. A dynamic alignment indicator refers to an indicator which is generated responsive to image data included in a video feed. For example, the dynamic alignment indicator can depict a location of a check 300 or other detected object within image data. Thus, unlike a static alignment guide which instructs a user to capture a document according to a predefined orientation, the dynamic alignment indicator can provide an indication of a sensed alignment. Advantageously, such an approach may aid a user in providing image data without having to provide explicit instructions as to, for example, how to orient a check. For example, rather than causing a user to flip an orientation of a check to match the alignment guide, the dynamic alignment indicator can provide an indication of alignment in various orientations (e.g., right-side-up, up-side-down, skewed, exhibiting keystone distortion, etc.). Further, the dynamic alignment indicator can prompt a user to provide additional non-document data in a video feed which can be employed, for example, by an anomaly detector to detect anomalies in the image data, such as anomalies corresponding to a risk score. Any of the dynamic alignment indicators, prompts, or bounding boxes of the present method 600 or the other systems and methods herein may be generated as a layer of an augmented image for an AR display device (e.g., the client device 110).

In some embodiments, the computing device 230 can provide the dynamic alignment indicator based on the bounding box 402 for the document. For example, the machine learning architecture can execute the alignment engine 208 to determine a location of an edge, vertex, field, or other aspect of a document within or along the bounding box edges or vertices. For example, the alignment engine 208 can determine a first concentric boundary within the bounding box 402 is a document or define a boundary of a check according to an absolute or relative positioning of one or more fields (e.g., a MICR line 306, address field, edge, etc.).

The generation of the alignment indicator can include the computer vision engine 206 generating a first label annotation of the bounding box 402. The computer vision engine 206 can include graphical annotation in the overlay, or a textual annotation, such as an indication of a pixel or other coordinate information of a location of the vertices thereof in the label annotation. To generate the alignment indicator, the computing device 230 can generate a second label annotation which further corresponds to the bounding box 402. For example, the computing device 230 can generate a second label annotation including a location of a corner, edge, or field of a check. The correspondence to the bounding box 402 can be a relative offset to the bounding box 402, a disposition along the bounding box 402, or an element bounded by the bounding box 402 (e.g., check field, corner, etc.). For example, the computing device 230 can define the second label annotation to be or otherwise correspond to an overlay element corresponding to an edge of the document, a corner of the document, or a data field of the document.

As indicated above with regard to the bounding box 402, the computing device 230 can determine other aspects of an overlay based on or confirmed by user input via a user interface. For example, a user can confirm or define a location of the various alignment indicators corresponding to data fields, edges, corners, or the like. For example, the user device can receive (for local processing or conveyance to the computing device 230) a confirmation of an element of the dynamic indication. Such a confirmation can be a confirmation of a displayed indicator or set thereof (e.g., selecting "OK" or "Confirm"), or can include selecting between multiple displayed elements, such as a first display element corresponding to a check and a second display element corresponding to a table or other background. The user device can receive a selection via a touchscreen over the presented image or another control element 412 and convey such an indication to the computing device 230.

In various embodiments, the dynamic alignment indicator is provided on a frame-by-frame basis. In some embodiments, the dynamic alignment indicator is provided based on a memory state model, such that a location of the dynamic alignment indicator in a first frame is provided based on a location of an image in a previous frame. For example, the dynamic alignment indicator can be provided based on prior frame data such that a latency between capturing and processing video data does not inhibit display. In some embodiments, frame-to-frame similarity checking can be employed to prevent errant display of a dynamic alignment indicator, though such checking may be omitted in many embodiments, where the document is expected to be relatively static in the image data.

In some embodiments, the alignment engine 208 can display (e.g., via an interface with the prompt generator 216), a prompt via the user interface, the prompt to provide an indication to adjust a camera device. Such a prompt may be provided at periodic interval, in response to a failure to provide a legible image within an elapsed time, or responsive to a confidence interval determined for the image. In some embodiments, the prompt generator 216 generates an explicit textual prompt. In some embodiments, the prompt generator 216 generates an element embedded in an overlay, such as a cue of the dynamic alignment indicator.

FIG. 7 is a flowchart illustrating operations of a method 700 for remotely processing document imagery, in accordance with some embodiments. The method 700 may include more or fewer operations than shown. The operations shown may be performed in the order shown, in a different order, or concurrently. Operations of the method 700 are described as executed by the computing device 230. However, such a description is illustrative and non-limiting. For example, operations of the present method 700 may be performed by one or more computing devices (also referred to as a computer), such as the computing device 230, the client device 110 of FIG. 1, or a combination thereof.

At operation 710, the computing device 230 receives a video feed including multiple frames from a user device. At least one of the frames includes image data depicting an object (e.g., a document, such as a check 300). The computing device 230 can receive the video feed over one or more networks, such as a Wi-Fi, cellular, LAN, or another network. For example, the computing device 230 can receive the video feed from a user device, such as the camera device as described with reference to operation 510 of the method 500 of FIG. 5, the user device as described with reference to the method 600 of FIG. 6, or the client device 110 of FIG. 1.

At operation 720, the computing device 230 executes an object recognition engine 202 of a machine learning architecture using the image data of the multiple frames, the object recognition engine 202 trained for detecting a type of document in the image data. Such an execution can include various aspects as described with reference to, for example, operation 520 of the method 500 of FIG. 5, operation 620 of the method 600 of FIG. 6, and throughout the present disclosure (e.g., with reference to the execution of the object recognition engine 202).

At operation 730, the computing device 230 determines content data represented on the document. For example, the computing device 230 can detect the content data in response to detecting the object as a document of the document type. For example, upon detecting the document as a check (or a front facing portion thereof), the computing device 230 can determine of content data such as drawee signature, MICR fields, check amount, or so forth.

In some embodiments, the computing device 230 can perform one or more validation checks of the content data. For example, the computing device 230 can provide the content data to a destination (e.g., a provider server 112, such as an ACH or a financial institution) responsive to such validation. Further, at operation 730, the computing device 230 can provide the content data to a same destination as the output image.

In some embodiments, the computing device 230 compares the content data to a predefined template to validate the content data. For example, the predefined template can include a format (e.g., number of characters, checksum, or other verification). In some embodiments, the computing device 230 can compare a first portion of content data to a second portion of content data. For example, computing device 230 can compare data content of a numerical amount field 314 with a written amount field 316, a routing number with another indication of a drawee bank, or an account number with a name, according to a relationship therebetween stored in the data repository 150.

In some embodiments, the computing device 230 can present a prompt including the content data. For example, the prompt can include a deposit amount, deposit source (e.g., account number, named drawee, or other aspect of the content data). In some embodiments, the prompt can omit at least a portion of the content data. For example, the prompt can prompt a user to enter a deposit amount, wherein the computing device 230 compare between the entered amount and a deposit amount indicated by the content data. The computing device 230 can further receive, from (e.g., according to) a control element of the user device, a confirmation of the content data. The confirmation can include, for example, entering data matching the determined content data, a binary confirmation of the determined content data, or so forth. In some embodiments, the presentation of the prompt can depend on a confidence of the determination of the content data, such as to request additional confirmation when a confidence score is less than a confidence threshold, and omitting the prompt where a confidence score exceeds the confidence threshold.

In some embodiments, a prompt is provided incident to a detection of an anomaly or other identification of a risk score. For example, in some embodiments, the prompt can further include a prompt to provide additional image data of the document, a user, a pin, biometric data (e.g., a picture of a user's face), enablement of location data, or other provision of information indicated by the prompt.

At operation 740, the computing device 230 generates an output image (sometimes referred to as packaged image) representing the document having the content data based upon the content data on the document data determined at operation 730 of the present method 700. For example, the computing device 230 can generate the output image (also referred to as a representative image or packaged image, without limiting effect) based on one or more frames of the image data. The generation of the image can include a comparison of image data to a quality threshold. For example, the comparison can determine legibility, sharpness, or other indicia of image quality. The comparison can include a comparison of image data as received from the frames, or manipulations thereof. For example, image data can be cropped, resized, denoised, compressed (e.g., features thereof), or otherwise manipulated.

In some embodiments, image manipulation may be performed or omitted responsive to at least one of a quality threshold or a fidelity threshold, the manipulation to generate enhanced images. A quality metric for an image can be compared to the quality threshold, and a fidelity metric for an image can be compared to the fidelity threshold. A fidelity metric can indicate a similarity/deviation of an image from a document as captured in frame data. The fidelity metric may be based on a difference between one or more frames of the image data and the reconstructed image.

In some embodiments, the computing device 230 conveys the output image to a provider server 112 in response to a determination of compliance with a predefined standard. The predefined standard can include either of the quality threshold (e.g., a predefined resolution, color depth (e.g., grayscale, black and white, etc., or other aspect) or a fidelity threshold (e.g., a similarity to a captured image). For example, a highly manipulated image can provide a quality in excess of a quality threshold but may be substantially dissimilar from a document as provided in image data such that the image may not meet a fidelity threshold. Conversely, an image which is provided without manipulation may exceed a fidelity threshold but may not meet a quality threshold (or conform to other aspects of a predefined standard). In some embodiments, at operation 740, the computing device 230 can generate an image to meet each of the quality and fidelity thresholds (e.g., according to local minimum at which a quality level and fidelity level are at least locally maximized). For example, the computing device 230 can generate the output image iteratively, responsive to a comparison to at least one of the quality threshold or the fidelity threshold (e.g., upon a determination that an image meets the quality threshold but does not meet the fidelity threshold, a second output image can be generated which includes lesser magnitude of manipulation).

In some embodiments, the computing device 230 generates the output image from multiple of the frames of the image data. For example, the computing device 230 can generate an output image including elements taken from various spatial or spatial-temporal patches of the document. A generation of an image from multiple frames including same information may be referred to as image reconstruction. For example, by combining an image having a first portion of fields of a first frame exceeding a quality or fidelity threshold with a first portion of fields of a second frame exceeding a quality or fidelity threshold, the server can generate an output image exceeding one or more of the thresholds for any available frame. Such combinations can refer to either of different portions of a same facing of the check, or different facings (e.g., front and back). The computing device 230 can apply any of the quality thresholds or fidelity thresholds on a per-facing basis, or per-document basis.

In some embodiments, the reconstruction employs a decoder of the machine learning architecture. Such employment can include a use of an encoder of an autoencoder to compress at least a portion of image data into a latent phase-space. The decoder of the autoencoder can reconstruct image data based upon the portion of the image data in the latent phase-space. For example, the encoder can generate a feature vector with reduced dimensionality (e.g., denoising an image to remove stray marks, minor variations in printed text, or the like), and the decoder can reconstruct the image with the reduced feature set. In some embodiments, the decoder may be employed for a subset of fields of a check. For example, the machine learning model can omit an execution of the decoder for a field annotated as hand printed may include execution for a field annotated as machine printed.

In some embodiments of the method 700, the machine-learning architecture may output the reconstructed image for the graphical user interface. For example, the computing device 230 can convey a prompt for presentation including the reconstruction image, and subsequently receive a confirmation of the reconstructed image. Such a confirmation can be received incident to a selection of a control element of the user device. The prompt generator 216 can generate a prompt including at least a portion of content data derived from the reconstructed image in addition to or instead of the image itself. For example, the prompt generator 216 can generate a prompt to confirm (e.g., approve or enter) an account number amount, deposit amount, etc. The computing device 230 can provide any content data to a same or different provider server 112 (e.g., ACH or financial institution) as the image. For example, the computing device 230 can provide the content data as annotations or other metadata as textual content, within the image, or so forth.

Referring generally to the present disclosure, server-side processing can, as indicated above, detect various instances of mechanical or digital manipulation. However, such off-loading may also deprive a user of timely feedback associated with certain local processing operations. To wit, certain operations executed by the computing device 230 can incur substantial delay. For example, data interchange between the computing device 230 and various provider servers 112, as may correspond to financial institutions or ACHs may be performed in other than real time. For example, as indicated above, such transfers can include overnight updates, off-line data transfers, or other batch transfers. Certain processing operations may indicate that one or more images are not suitable for processing, or that documents include other indicia of non-eligibility for processing. Although certain of these processing operations (e.g., related to certain fraud-detection measures) may be retained server-side, or otherwise not be communicated to a user, at least some validations (ensuring a check is properly endorsed, ensuring no typos are present, ensuring all fields are readable) may be exposed to a user proximal to the capture of such data, as may aid the user to remedy certain deficiencies.

Moreover, provision of video feed data to the computing device 230 can include substantial content which is not related to high-risk transactions, and can consume substantial compute resources. By apportioning (or repeating) certain validation operations on a local device instead of (or in addition to) the computing device 230, a process latency may be abbreviated. For example, where a document processed according to the systems and methods disclosed herein is a check, a determination, performed locally via a client device 110, can provide an indication that the check itself, or image data relating thereto will not be used for processing the check. Such an indication can prompt a user to remedy any deficiencies (e.g., endorse the check, re-orient a camera, etc.). The indication can relate to a prediction of a violation of a validation rule engine of the computing device 230 itself, or any of various provider servers 112 as may be coupled with the computing device 230. Accordingly, such validation operations, as may be performed by the client device 110, may inform a user of a deficiency of a document that may otherwise go unnoticed for hours or days into the future, and further reduce a processing load for the computing device 230 or various provider servers 112 coupled therewith. Referring specifically to the example of a check, such a prediction may avoid rejections of remote deposit of checks, and associated non-sufficient fund fees. Further, such timely notification can avoid an end user re-locating checks that were understood to be previously deposited, and may have been discarded or destroyed (e.g., indicated as "VOID" as is commonly performed following a deposit). More generally, failure to authenticate documents (including various documents other than checks) as may be provided via image data provided to a computing device 230 may be associated with inconvenience and expense, in additional to increase to processing load experienced by the computing device 230 or provider servers 112 coupled therewith. Such increased processed load (and energy use, latency), may owe at least to a repetition of the methods performed responsive to receiving an indication of non-validation (e.g., as may be performed by the server 112 or provider servers 112 coupled therewith).

Some particular examples of data validation that may be performed locally, via a client device 110 include illustrative examples provided as methods 800, 900 as described henceforth. These methods 800, 900 should not be construed so as to limit the present disclosure. In some embodiments, further methods may be performed. Further, the execution the methods provided henceforth should not be construed so as to displace the performance of same or similar methods via a computer disposed remote from the computing device (e.g., the computing device 230 or provider servers 112 coupled therewith). Indeed, according to some implementations, the methods 800, 900 may repeat or substantially overlap with methods performed at the computing device 230 or provider servers 112. For example, the local execution of the methods 800, 900 may be performed to predict a validation operation of the computing device 230 or provider servers 112 (though the implementation details may vary according to performant or security criteria, such as avoiding exposing a fraud detection model to a local user device 110).

Figure 8A:
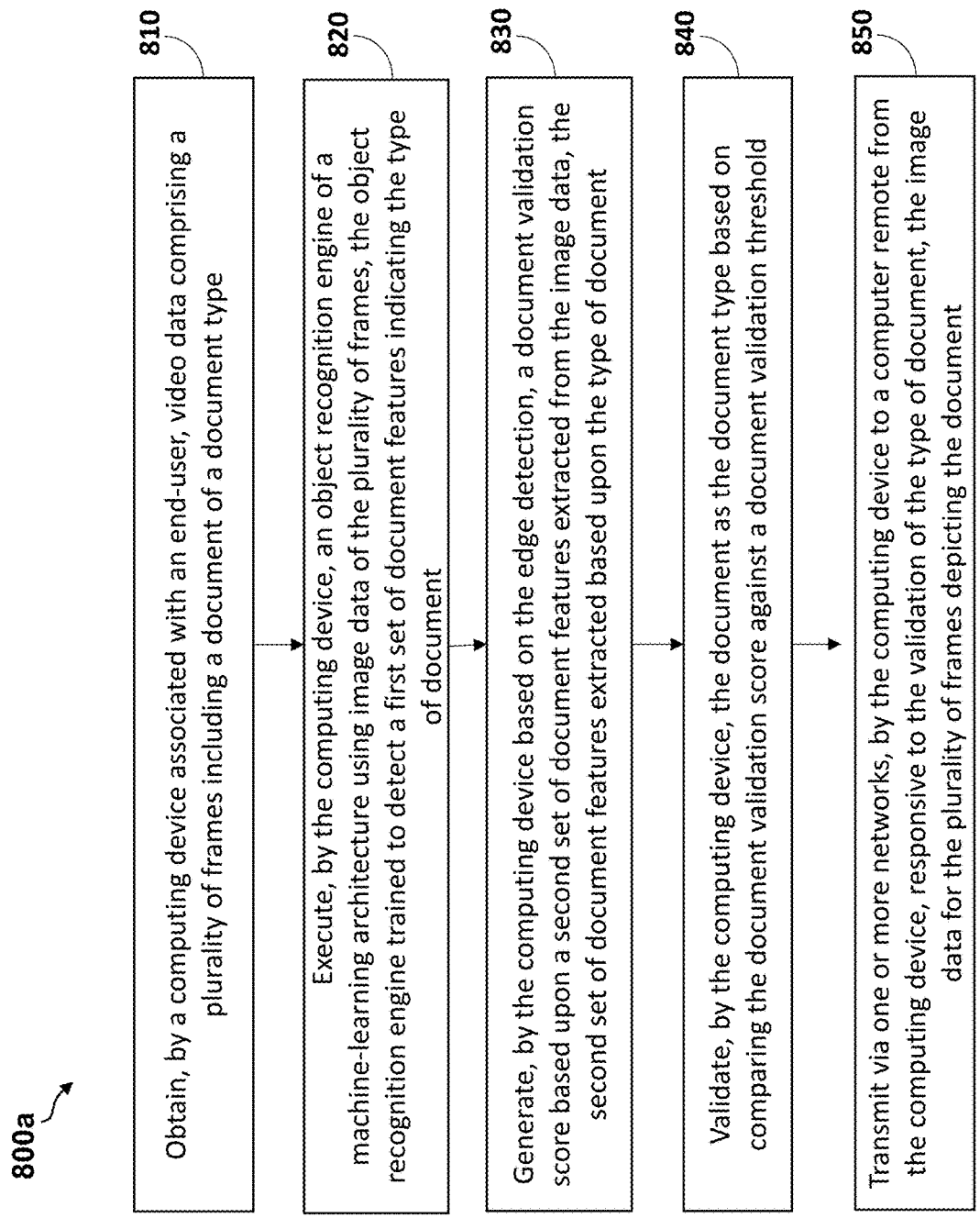
FIG. 8A is a flowchart illustrating operations of a method for locally validating a type of document included in image data intended for provision to a remote computing device, in accordance with some embodiments.

Referring more particularly to FIG. 8A, a flowchart illustrating operations of a method 800 for locally validating a type of document included in image data intended for provision to a remote computing device (e.g., the computing device 230 or the provider servers 112) is provided. The method 800 may include additional or fewer operations than shown. The operations shown may be performed in the order shown, in a different order, or concurrently. Operations of the method 800 are described as executed by a computing device associated with an end user (e.g., a client device 110). However, as indicated above, such a performance should not be construed as limiting a same or similar method as may be performed remote therefrom.

At operation 810, the computing device obtains video data including multiple frames including a document of a document type. For example, the document can include a financial instrument such as a check, wherein the type of documents can include the financial instrument type (e.g., the check). In various embodiments, the financial instrument type can refer to various genus or species of a document type. For example, where the financial instrument type corresponds to a check, the document type may refer to all checks, or a subset of checks. The subset of checks can refer to, for example, checks associated with a particular drawer (e.g., entity issuing the check) or drawee (e.g., the institution on which the check is drawn), or other classifications, such as personal checks, handwritten checks, pre-printed checks, checks including particular security features, or so forth.

In some embodiments, the computing device can generate the frames by activating a camera of the computing device. For example, the camera may be integral to the computing device, as in the case of a mobile device including a camera. In some embodiments, the computing device can attach to the camera (e.g., via a signed or run-time compiled driver, as may authenticate the local presence of the camera).

At operation 820, the computing device executes an object recognition engine of a machine-learning architecture using image data of the frames. The object recognition engine may be trained to detect a first set of document features indicating the type of document, such as edges of documents or various further features or content data. For example, the object recognition engine may be implemented as an edge detection engine, as may detect edges according to a Sobel operator, Canny edge detector, or other techniques (e.g., thresholding the boundary of the document, according to Otsu's, adaptive, multilevel, or other methods). In some embodiments, the object detection engine can detect various further content data, such as positions of fields, content data for the fields, or so forth. In some implementations, for example, the computing device may execute the object recognition engine of the machine-learning architecture using at least a portion of image data, of one or more frames of the video data, to detect the document type. The machine-learning architecture of the object recognition engine includes machine-learning models trained to, for example, detect the document type using a first set of document features indicating the type of document extracted using the image data, and generate a document validation score indicating a likelihood that the document is a valid document using a second set of document features extracted using the image data (as in later operation 830).

An edge detection model may be configured to detect multiple edges of a rectangle, (e.g., four edges, or less than four edges, wherein further edge(s) may be generated from the detected edges). The computing device can use the dimensions of the rectangle to validate the document as the document type (e.g., alone, or in combination with further extracted features). Such validation can be performed according to the execution of the machine learning model (e.g., where a validation score corresponds to an output layer of a network for the object recognition engine), or separate therefrom (e.g., according to a subsequent operation). In some embodiments, the subsequent operation can include comparing the dimensions of the rectangle to a predefined list of dimensions. For example, the predefined list may be for various document types or classes (e.g., the various drawers or drawees), as may be determined according to information from the image data, or as otherwise obtained by the computing device (e.g., via a user entry into a user interface). In some embodiments, the dimensions of the rectangle may be provided according to an arbitrary scale (e.g., without determining a depth of the document within the image data). In some embodiments, spatial dimensions (e.g., inches or millimeters) of the rectangle may be provided according to depth sensing performed according to LiDAR or dual camera processing, or other augmented reality techniques (e.g., visual-inertial odometry).

In some embodiments, the object recognition engine may be implemented as a classification model, to classify documents according to a document type. One or more layers of a network for the classifier may be trained to detect the edges of a rectangle corresponding to boundaries of the document, as may be implemented on a shallow hidden layer of a convolutional or other neural network. The validation of the documents as the document type (as is further referred to with regard to operation 840) may be based on, a classification performed by of the classification model. For example, the validation may be performed incident to the classification of the document as matching the document type, where the classification model classifies a object in image data as a type of document object (e.g., check). The classifier or other aspect of the machine-learning architecture may generate a document validation score indicating a likelihood or confidence or other indicia of that an input or inbound document in the image data matches to an valid (expected or registered) document, based on similar attributes, such as a MICR code, satisfying a document validation threshold.

The execution of the object recognition engine can include ingesting, by the object recognition engine, image data from the frames of the video data. For example, the image data may be provided as captured by the camera (e.g., to include local post-processing thereof), or may differ from frames of the video data, as captured. Such differences can include, for example, adjustments to brightness, contrast, or saturation as may improve detectability of text or other features of the document (e.g., anti-fraud features). In some embodiments, the computing device may generate a spatial transform to generate the image data from the video data. For example, the spatial transform can include a lateral translation, resizing, rotation, reflection, cropping, or de-skewing, relative to the video data generated at a camera of the computing device. For example, the computing device can be configured to de-skew or otherwise transform the document responsive to the detection of multiple of the edges. Such spatial transform operations may be performed by the object recognition engine (e.g., at a deeper layer than the detection of the edges), or external to the object recognition engine, such as via another component of the computing device (e.g., a deterministic skew corrector).

In some embodiments, the computing device identifies, based on the detected edges, various boundaries of the document. In some embodiment, the identification may be performed concurrently with the execution of the machine learning model (e.g., at operation 820). For example, as is indicated above, the identification of the boundary may be determined according to a determination of a rectangle defining a boundary of the document, or a classification model determining a class of a document as a particular document type (e.g., a check generally, a check of a drawee or drawer, type thereof, etc.). In some embodiments, the identification of the boundaries of the document is performed subsequent to the determination of the edges. For example, the determination of the edges can determine various edges including boundary edges, of the document, boundary edges of other objects such as a countertop or table, or edges between various fields of the document, such as the numerical amount field 314, written amount field 316, or MICR line 306 as are depicted in FIG. 3A. The subsequent identification can discriminate between the various internal edges (e.g., numerical amount field 314), external edges (e.g., a table edge), and boundary edges for the document (e.g., rectangular bounds of a rectangular check).

At operation 830, the computing device generates a document validation score based upon a second set of document features extracted from the image data. The second set of document features may be extracted based upon the type of document. For example, where the document is a check, the second set of document features can include check boundary dimensions, MICR line data, or other features associated with one or more fields of the check, various examples of which are provided throughout the present disclosure. In some embodiments, the computing device generates the validation score with a separate instance of an object recognition model. In some embodiments, the computing device generates the validation score according to an execution of a same instance of the object recognition model (e.g., a confidence score or other value for a classification). In some embodiments, the computing device generates the validation score using a deterministic technique executed subsequent to the execution of the object recognition engine.

In some embodiments, the validation score is generated according to a distance between the document and the document type. For example, a distance may refer to or include a distance of a spatial dimension (e.g., the boundary), or a distance within a non-spatial phase space. For example, the computing device can determine a hyperplane location corresponding to the document, and determine a cartesian, cosine, or other distance between the determined location and another location for the document type. For example, the other location for the document type can refer to a center point or other aspect of a cluster of other documents of the document type (as may be determined according to a k-means or Gaussian mixture model). In some embodiments, the distance can be determined based on all or a subset of document features or fields. For example, content data of a zip code field may be omitted in favor of a location or content of a MICR line.

In some embodiments, the computing device generates the validation score based upon identifying a first set of validation criteria corresponding to clerical or imaging errors. Using the illustrative example of a check, clerical errors can include omitted endorsement signatures or scrivener errors in dates or names, while imaging errors can include oversaturation, portions of document not legible or not included within video frames, or motion blur. For example, the first set of validation criteria may not correspond to an increase in fraud risk or may be readily addressable by an end-user (e.g., by endorsing the check, or recapturing video data). Accordingly, the computing device can convey the indication of the first set of validation criteria via presentation, via a user interface of the user device. For example, the computing device may generate a graphical user interface indicating any of the first set of validation criteria as were not validated. Such a presentation may cause the end-user to provide updated video data which may be validated (e.g., may lack the clerical or image errors), which may reduce compute load at a remote device such as a computing device 230 or provider server 112, and further reduce energy use or latency incurred at the computing device 230 or provider server 112. Further, such an indication can alert a user to an issue as may avoid delays in depositing a check or executing other documents (e.g., other financial instruments).

In some embodiments, the computing device generates the validation score based on identifying a second set of validation criteria (e.g., corresponding to digital or mechanical manipulation of the document). Unlike the first set of validation criteria, the second set of validation criteria may not be presented to a user (e.g., to avoid alerting a suspected fraudster to a forgery imperfection). Accordingly, the computing device can convey the second set of validation criteria to the computer without presentation to an end user (e.g., may omit presenting, via the user interface as described above with regard to the first set of validation criteria). For example, the computing device can convey the identification of the second validation criteria via encrypted communication with the computer, over the one or more networks of operation 850 (e.g., the Internet).

At operation 840, the computing device validates the document as a type of document. For example, the computing device can validate the document as the document type based on a comparison between the document validation score against a document validation threshold. In some embodiments, the document validation threshold can include a single value (e.g., ranging from 0 to 1 or 1 to 100). In some embodiments, the document validation score and a corresponding portion of the document validation threshold can include multiple constituent values, such as a first value corresponding to a spatial dimension of a boundary, a second value corresponding to a presence of a MICR field, and a third portion corresponding to a presence of a security feature. In some embodiments, the determination or components of the document validation score vary according to document type, such that the comparison can include multiple sub-operations as may each be provided with a separate weighting. For example, a document type corresponding to a check from a particular drawee may include a control number, or an alignment guide. The computing device can determine the document validation score based on the presence of such a feature. Further, the computing device can compare an indication of the presence to a threshold as a portion of the comparison between the document validation score to the document validation threshold to validate the document as the document type.

The comparison of the validation score can include comparing a match score for a match between the boundaries of the document (e.g., based on a comparison of dimensions of a rectangle corresponding to the document to a predefined set of document dimensions. For example, a data structure (e.g., look-up-table, LUT or range mapping table for the rectangle dimensions) can include dimensions (or ranges thereof) corresponding to one or more document types to validate the document. As indicated above, the matched document type can correspond to various issuers (e.g., drawers or drawees). That is, the match can include matching the identified boundaries to a predefined dimension (e.g., a set thereof) of various predefined dimensions having predefined or expected boundaries corresponding to predefined or expected edges, the various predefined dimensions corresponding to various document issuers. Each of the predefined dimensions can correspond to at least one separate predefined issuer.

In some embodiments, multiple validation thresholds are provided. For example, a first threshold can correspond to warning generation (e.g., warning threshold) or alert trigger, which triggers or instructs a computing device to generate an alert or warning indicator for presentation to a user via a user interface. The warning can prompt a user to retain the document, or recapture the obtained video data, however, the end-user may acknowledge the warning (e.g., by selecting a prompt of a notification presented to the user via a user interface), and proceed to operation 850. A second threshold can correspond to non-validation. Accordingly, the computing device can generate the graphical user interface including an indication of the comparison to the first threshold (e.g., a warning prompt or other notification) or the second threshold (e.g., an indication of non-validation, as may be accompanied by instructions associated with particular validation criteria, such as instructions to endorse a check, place the document on a high-contrast background, adjust lighting, or so forth).

In some embodiments, the validation can include any of various further operations, such as any of the various techniques described herein, such as generation of further instances of document validation scores or components thereof (e.g., ranged components, such as ranging from 0 to 1 or binary components such as pass/fail criteria) and comparison to thresholds, or other validation operations or matches. For example, the validation can include validating a content, legibility, or presence of various fields of the document type, or other content or features thereof. The computing device can validate the document as the type of document, at least in part, by determining that the image data substantially consists of the document. For example, the computing device can identify a subset of the video data (or image data) including the document and compare the subset to an occupancy threshold to validate the document.

At operation 850, the computing device transmits, to a computer remote from the computing device (e.g., the computing device 230), the image data for the frames depicting the document. The computing device transmits the image data responsive to the validation of the type of document. The computing device can transmit the image data via one or more networks, such as a public network, private network, local network, wide area network, etc. For example, the computing device can couple with the computing device 230 and transmit the image data via the internet, a cellular connection of a mobile device, or various other public or private networks.

In some embodiments the image data transmitted to the computer is transmitted in a video feed comprising multiple of the plurality of frames of the video data. That, is all or a portion of the video feed may be provided to the computer, as may aid the computer to conduct liveness checks or other validations. In some embodiments, the portion of the video feed may be selected based on local validations. For example, the computing device can determine that a subset of the video data includes all fields or boundaries of the document in sufficient clarity/legibility, and thus provide the subset, as may reduce data transmission latency, processing, and otherwise aid remote processing of the data upon its receipt by the computer. Such determinations may further reduce a battery draw/energy usage or medium access contention at the computing device, as corresponding to a reduced active time of a transceiver of the computing device.

Figure 8B:
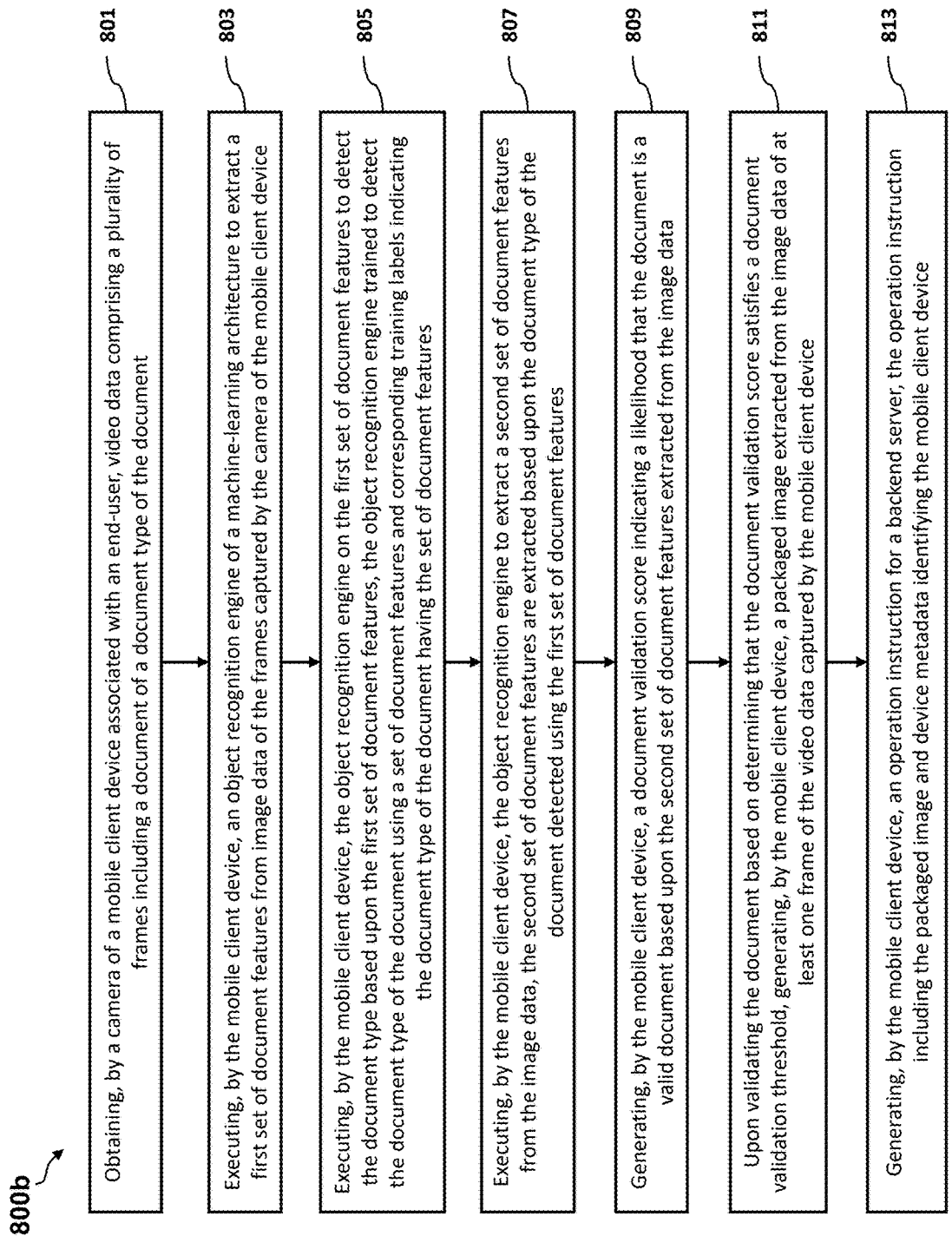
FIG. 8B is a flowchart showing operations of an example implementation of the method in FIG. 8A, in accordance with some embodiments.

FIG. 8B is a flowchart of an example method 800b as an example implementation of the method 800a in FIG. 8A, as a method 800b for client-side validation of document-imagery for remote processing and validating a type of document included in image data intended for a user-requested operation for a remote backend server or other computing device (e.g., the computing device 230 or the provider servers 112). The method 800b may include additional or fewer operations than shown. The operations shown may be performed in the order shown, in a different order, or concurrently. Operations of the method 800b are described as executed by a computing device associated with an end user (e.g., a client device 110). However, as indicated above, such a performance should not be construed as limiting a same or similar method as may be performed remote therefrom.

At operation 801, obtaining, by a camera of a mobile client device associated with an end-user, video data comprising a plurality of frames including a document of a document type of the document. At operation 803, executing, by the mobile client device, an object recognition engine of a machine-learning architecture to extract a first set of document features from image data of the plurality of frames captured by the camera of the mobile client device.

At operation 805, executing, by the mobile client device, the object recognition engine on the first set of document features to detect the document type of the document based upon the first set of document features, the object recognition engine trained to detect the document type of the document using a set of document features and corresponding training labels indicating the document type of the document having the set of document features.

At operation 807, executing, by the mobile client device, the object recognition engine to extract a second set of document features from the image data, the second set of document features are extracted based upon the document type of the document detected using the first set of document features.

At operation 809, generating, by the mobile client device, a document validation score indicating a likelihood that the document is a valid document based upon the second set of document features extracted from the image data.

At operation 811, upon validating the document based on determining that the document validation score satisfies a document validation threshold, generating, by the mobile client device, a packaged image extracted from the image data of at least one frame of the plurality of frames of the video data captured by the mobile client device. At operation 813, generating, by the mobile client device, an operation instruction for a backend server, the operation instruction including the packaged image and device metadata identifying the mobile client device.

Figure 9A:
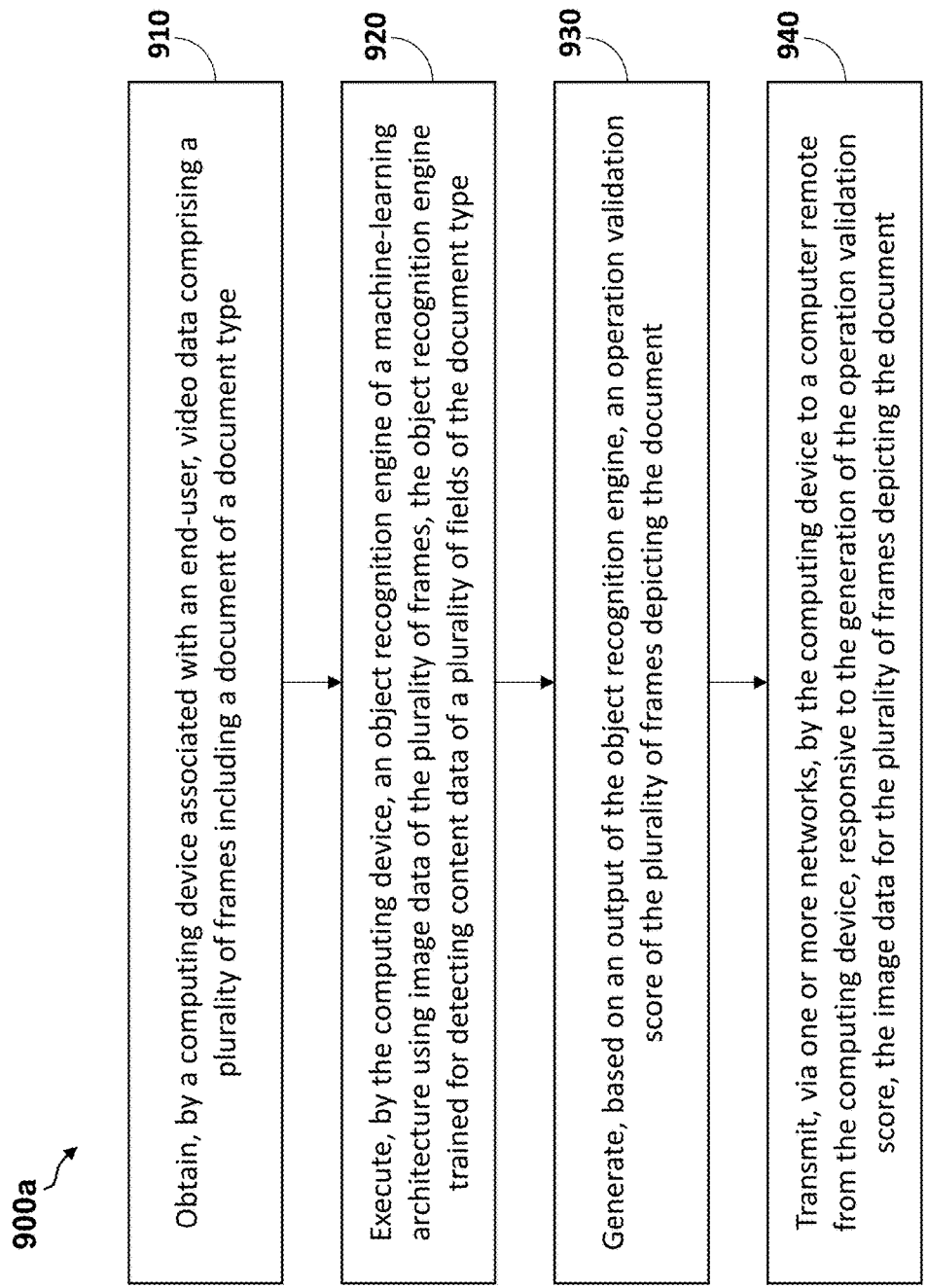
FIG. 9A is a flowchart illustrating operations of a method for validating features of a document in image data intended for provision to a remote computing device, in accordance with some embodiments.

FIG. 9A is a flowchart illustrating operations of a method 900a for validating features of a document in image data intended for provision to a remote computing device (e.g., the computing device 230 or the provider servers 112). The method 900a may include additional or fewer operations than shown. The operations shown may be performed in the order shown, in a different order, or concurrently. Operations of the method 900a are described as executed by the client device 110. However, as indicated above, such a performance should not be construed as limiting a same or similar method as may be performed remote therefrom.

At operation 910, the computing device obtains video data including multiple frames including a document of a document type. For example, the computing device (e.g., mobile phone) can generate or otherwise obtain the video data as described with regard to operation 810 of the previously described method 800a, or as otherwise provided according to the present disclosure.

At operation 920, the computing device executes an object recognition engine of a machine-learning architecture using image data of the plurality of frames. The machine learning model may be trained for detecting content data of a plurality of fields of the document type. For example, the machine learning model may be trained to determine a legibility of various fields of the document, or to determine content data from text or other features of the various fields. Accordingly, the computing device can execute the machine learning model to determine a legibility of one or more fields of the document. In some embodiments, the legibility is determined incident to detecting content data (e.g., textual content), though the determination of the legibility need not include determining the content. For example, the determination of legibility can be performed as distinct from detecting OCR or other techniques to determine content data. In some embodiments, the computing device can determine the eligibility (or extract textual or other data) based on selection criteria specific to a field type of the document. For example, the computing device can determine a legibility of a signature according to first criteria (e.g., stroke continuity, shape symmetry, stroke direction, line curvature, pen lifts, etc.). The computing device can determine a legibility of a numeric field, such as the numerical amount field 314 of FIG. 3A, according to second criteria (e.g., a match to numeric characters). The computing device can determine a legibility of another textual field, such as the written amount field 316 of FIG. 3A, according to third criteria (e.g., a match to alphanumeric or alphabetic characters).

At operation 930, the computing device generates an operation validation score of the plurality of frames depicting the document, based on an output of the object recognition engine. In some instances, the operation validation score can be generated as a binary indicator (e.g., 1/0 or pass/fail). In some instances, the operation validation score can be determined according to a range. For example, the score can range from zero to one, from one to one hundred, etc. In some instances, the operation validation score can include constituent scores relating to particular aspects of validation. For example, the operation validation score can include (or correspond to) constituent (or other) scores, such as image quality scores, digital manipulation scores, mechanical manipulation scores, legibility scores, fidelity scores, congruence scores, or so forth.

In some embodiments the computing device can determine a content similarity or congruence score indicating a congruence between first data of a first content field of the document and second data, differing from the first data, of a second content field of the document. For example, the computing device can determine a degree of congruency (or similarities) between content data of a content field such as a numerical amount field (an illustrative example of which is depicted in FIG. 3A) and content data of another content field such as a written amount field (an illustrative example of which is also depicted in FIG. 3A). The computing system can determine, for example, that a string of "five hundred and eleven" in the written field is congruent to a numeric field of "$511.00". That is, the congruency check can be performed on content data extracted from the image data. Such a congruency check can capture incongruencies, such as detection of a slashed seven as a 4, or a null character (Ø) as an eight, rather than a zero. Such an illustrative example should not be construed as limiting. In various embodiments, the computing system can verify various other congruencies, such as a congruency between MICR and other data (e.g., a drawer or drawee). Such a congruency test may be performed to validate the document, such that documents which may not be validated upon their conveyance to the computing device 230 or a remote provider server 112 may be determined as non-validated (or likely to be non-validated) at time of data entry, such that a user can be prompted to obtain (e.g., generate) further video data, correct minor errors, or be aware that the execution of the document may be delayed or rejected (e.g., to avoid potential overdrafts).

In some embodiments, the computing device is configured to detect an omission of one or more fields of the document. For example, the computing device can detect a lack of an endorsement or other content data associated with other fields of the document. The computing device can generate a graphical user interface for presenting an indication of the omission via the graphical user interface. For example, the omission may be detected prior to a (e.g., second) execution of operation 910, such that the video data of operation 910 is captured subsequently to the presentation of the GUI. That is, the user can correct the omission and cause the computing device to begin (e.g., repeat operations of) the present method 900a. For example, the computing device can detect that no endorsement is present, or than only one endorsement is present for a check payable to a first AND second party.

In some embodiments, the computing device can generate the operation validation score by determining a first validation score for the documents and comparing the first validation score to one or more thresholds. For example, the computing device can compare the first validation score to a first threshold corresponding to non-validation, as well as to a second threshold corresponding to warning generation, as described above with regard to operation 840 of the previously described method 800a. More generally, in some embodiments, the GUI can be configured to receive an indication to proceed without further data. For example, the drawer of an instrument may not have filled a memo field, but the end-user may wish to proceed with the deposit, as the drawer may not be available to complete the field. However, the notification can alert the user to retain the instrument and be aware that a delay or rejection in processing may occur.

In some embodiments, the computing device can identify separate sets of validation criteria as described above with regard to operation 840 of the previously described method 800a. For example, the computing device can identify a first set of validation criteria corresponding to clerical or imaging errors and identify a second set of validation criteria corresponding to digital or mechanical manipulation of the document. The computing device can proceed to, upon identification, convey the identification of the first set of validation criteria via presentation, via a user interface of the computing device or the second set of validation criteria via encrypted communication with the computer (e.g., without presentation via the user interface of the computing device).

In some embodiments, the computing device can determine further elements of, or aspects related to, the operation validation score. For example, the computing device can predict a quality score for the document using multiple of the one or more images (e.g., according to a maximum, average, or other quality score for one or more scores of the various images/frames). The computing device can compare the quality score to a quality threshold to determine the operation validation score. The prediction can correspond to another score generated by the computing device 230 or provider servers 112. For example, the computing device can generate a local score to predict a score generated remotely. The generation of the local score may be identical to, or differ from, the remote generated score (as may be generated by the computing device 230 or provider servers 112). For example, the local score may be determined according to techniques compatible with, for example, a mobile device, or according to a subset of techniques, as may avoid unintentional disclosure of certain proprietary operations (e.g., anti-fraud measures). The references to the quality score (e.g., image quality score) should not be construed as limiting; the computing device can execute any of various further operations disclosed as executed by any of the computing device 230 or provider servers 112 disclosed herein, or facsimiles thereof. For example, in some embodiments, the computing device can predict (e.g., generate) a fidelity score for the document using a multiple of the one or more images and compare the fidelity score to a fidelity threshold to determine the operation validation score.

At operation 940, the computing device transmits, via one or more networks, to a computer remote from the computing device (e.g., the computing device 230), the image data for the frames depicting the document. The computing device can transmit the image data responsive to the validation of the type of document. For example, the computing device (e.g., mobile phone) can transmit the image data as described with regard to operation 850 of the previously described method 800a, or as otherwise provided according to the present disclosure (e.g., according to operation 610 or 710 of respective methods 600, 700).

Figure 9B:
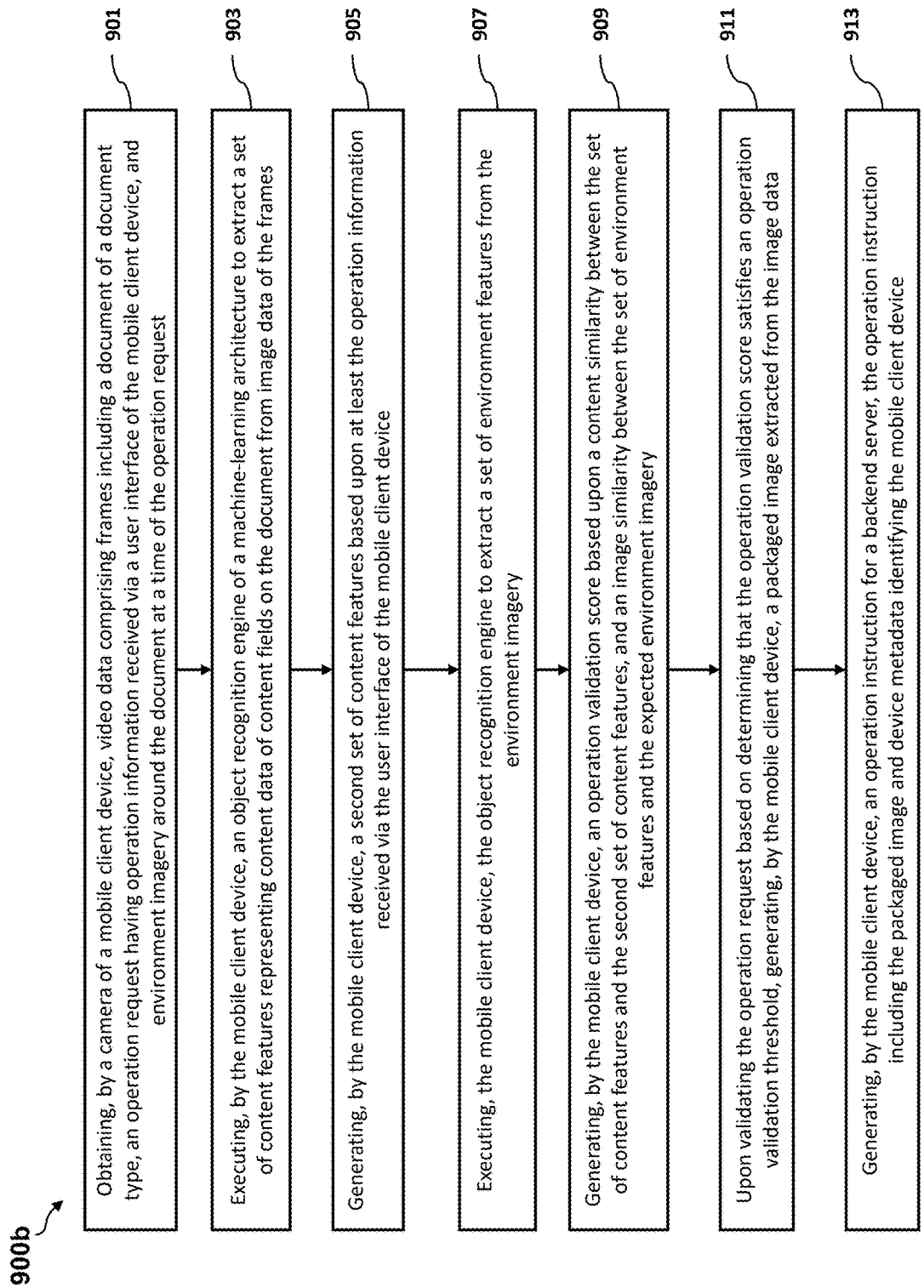
FIG. 9B is a flowchart showing operations of an example implementation of the method of FIG. 9A, in accordance with some embodiments.

FIG. 9B is a flowchart of an example method 900b as an example implementation of the method 900a in FIG. 9A, as method 900b for client-side validation of document-imagery for remote processing and validating an operation request associated with image data intended for the user-requested operation for a remote backend server or other computing device (e.g., the computing device 230 or the provider servers 112). The method 900b may include additional or fewer operations than shown. The operations shown may be performed in the order shown, in a different order, or concurrently. Operations of the method 900b are described as executed by a computing device associated with an end user (e.g., a client device 110). However, as indicated above, such a performance should not be construed as limiting a same or similar method as may be performed remote therefrom.

At operation 901, obtaining, by a camera of a mobile client device associated with an end-user, video data comprising a plurality of frames including a document of a document type, an operation request having operation information received via a user interface of the mobile client device, and environment imagery about the document at a time of the operation request.

At operation 903, executing, by the mobile client device, an object recognition engine of a machine-learning architecture to extract a set of content features representing content data of a plurality of content fields on the document from image data of a portion of the plurality of frames, the object recognition engine trained for detecting the plurality of content fields for the document type and the content data of the plurality of content fields.

At operation 905, generating, by the mobile client device, a second set of content features based upon at least the operation information received via the user interface of the mobile client device.

At operation 907, executing, the mobile client device, the object recognition engine to extract a set of environment features from the environment imagery, the object recognition engine trained for detecting the set of environment features using the environment imagery and corresponding training labels indicating expected environment imagery.

At operation 909, generating, by the mobile client device, an operation validation score based upon a content similarity between the set of content features and the second set of content features, and an image similarity between the set of environment features and the expected environment imagery, the operation validation score indicating a likelihood that the document is a valid document and is associated with the operation request]

At operation 911, upon validating the operation request based on determining that the operation validation score satisfies an operation validation threshold, generating, by the mobile client device, a packaged image extracted from the image data of at least one frame of the plurality of frames of the video data captured by the mobile client device. At operation 913, generating, by the mobile client device, an operation instruction for a backend server, the operation instruction including the packaged image and device metadata identifying the mobile client device.

Figure 10A:
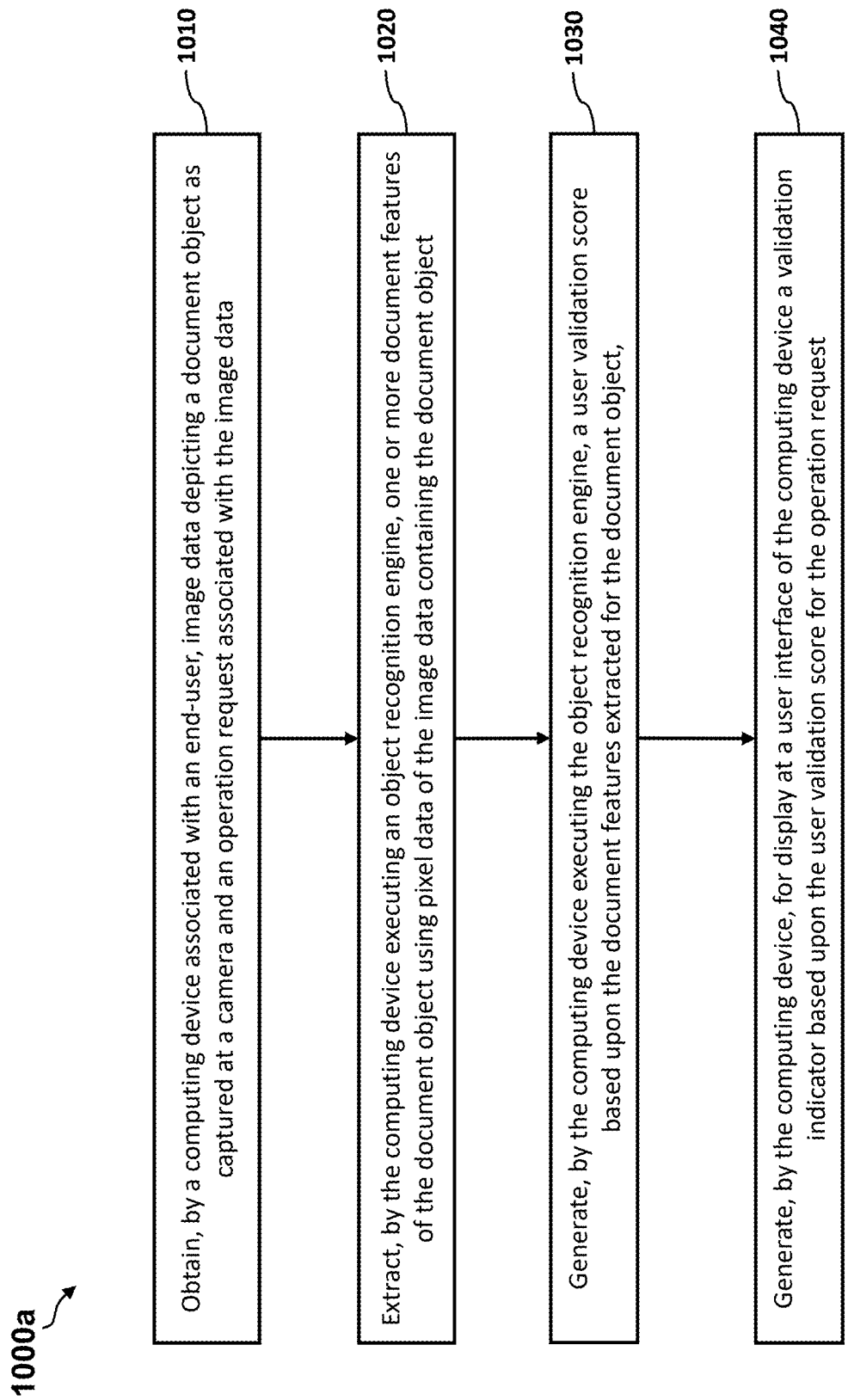
FIG. 10A is flowchart illustrating operations of a method for client-side input validation for remote processing of document imagery, in accordance with some embodiments.

FIG. 10A is flowchart illustrating operations of a method 1000a for client-side input validation for remote processing of document imagery, in accordance with some embodiments. The method 1000a includes a computing device associated with an end-user that executes a machine-learning architecture having machine-learning models or machine-learning techniques trains for recognizing types of documents and document features for validating an end-user as being an expected a registered customer expected to be associated with a particular document based upon the document images or document features. For instance, a client-side AI/ML-based object recognition engine may be trained to recognize features of a document or portion of the document (e.g., check or portion of the check) for a given end-user customer, and then validate whether a later inbound or input document was actually received from the registered or expected end-user customer. The object recognition engine may output a transaction or user validation score (or other types of values) indicating a predicted likelihood that the registered end-user customer is the registered user who is attempting to submit the input or inbound document.

In some embodiments, a central server or the computing device (or other computing device) may train or re-train aspects of the machine-learning architecture of the object recognition engine. The object recognition engine may be trained for detecting the document features of the document object based upon a training dataset comprising a plurality of training document images and training labels corresponding to the training document images, or other expected types of information (e.g., expected environment imagery). Each particular training label may indicate the type of document of the corresponding document image for supervised or semi-supervised learning performed by the central server or the computing device executing a loss function. The object recognition engine may be trained for generating the user validation score based upon a training dataset comprising a plurality of prior document images associated with the expected registered user corresponding to a plurality of training labels. Each particular training label indicates, for example, at least one of a user identifier associated with the corresponding prior document image or the document features of the corresponding prior document image for supervised or semi-supervised learning performed by the central server or the computing device executing the same or different loss function.

At operation 1010, the computing device obtains image data depicting a document object as captured at a camera and an operation request associated with the image data. The operation request is based upon an end-user input entered at the user interface of the computing device, which may include an input indicating a user instruction or selection. For instance, the operation request may instruct the computing device to capture image data (e.g., video feed of frames; one or more images) containing a document object. The computing device may obtain (e.g., retrieve, receive) the image data from a camera coupled to the computing device or from a non-transitory storage medium of the computing device. In some cases, the computing device may obtain the image data by receiving a video feed from the camera comprising a plurality of frames, where these frames may include one or more frames that contain the image data depicting the object.

The operation request may include an instruction for the computing device to perform one or more operations using the image document object, such as updating an account value based upon a deposit operation or executing a backend value exchange between backend servers or accounts based upon a transfer operation. In some cases, the computing device obtains the operation request by receiving by the operation request, via the user interface of the computing device, where the operation request indicates the requested operation to be performed.

At operation 1020, the computing device extracts one or more document features of the document object using pixel data of the image data containing the document object. The computing device may execute a machine-learning model of the object recognition engine having parameters trained for extracting the document features.

At operation 1030, the computing device executes the object recognition engine to generate a user validation score based upon the document features extracted for the document object. The machine-learning architecture of the object recognition engine includes one or more machine-learning models trained for detecting or recognizing the document features of the document object. The machine-learning architecture of the object recognition engine may include one or more machine-learning models trained for generating a user validation score indicating a likelihood that the end-user is a registered user according to the document features and/or a recognized document object.

In some embodiments, the computing obtains image data for the document object by parsing a portion of pixel data of the image data that contains a portion of the document object. The computing device may extract the one or more document features of the document object using the portion of the pixel data. The computing device may then generate the user validation score based upon the document features extracted for the particular portion of the document object.

At operation 1040, the computing device generates a validation indicator for display at a user interface of the computing device. The computing device generates the validation indicator based upon the user validation score for the operation request, where the validation indicator may indicate to the end-user or other user (e.g., system administrator) whether the computing device successfully validated the end-user as the registered user or unsuccessfully validated (or rejected) the end-user. The computing device may determine whether to validate the user based upon, for example, comparing the user validation score against a user validation threshold score.

Figure 10B:
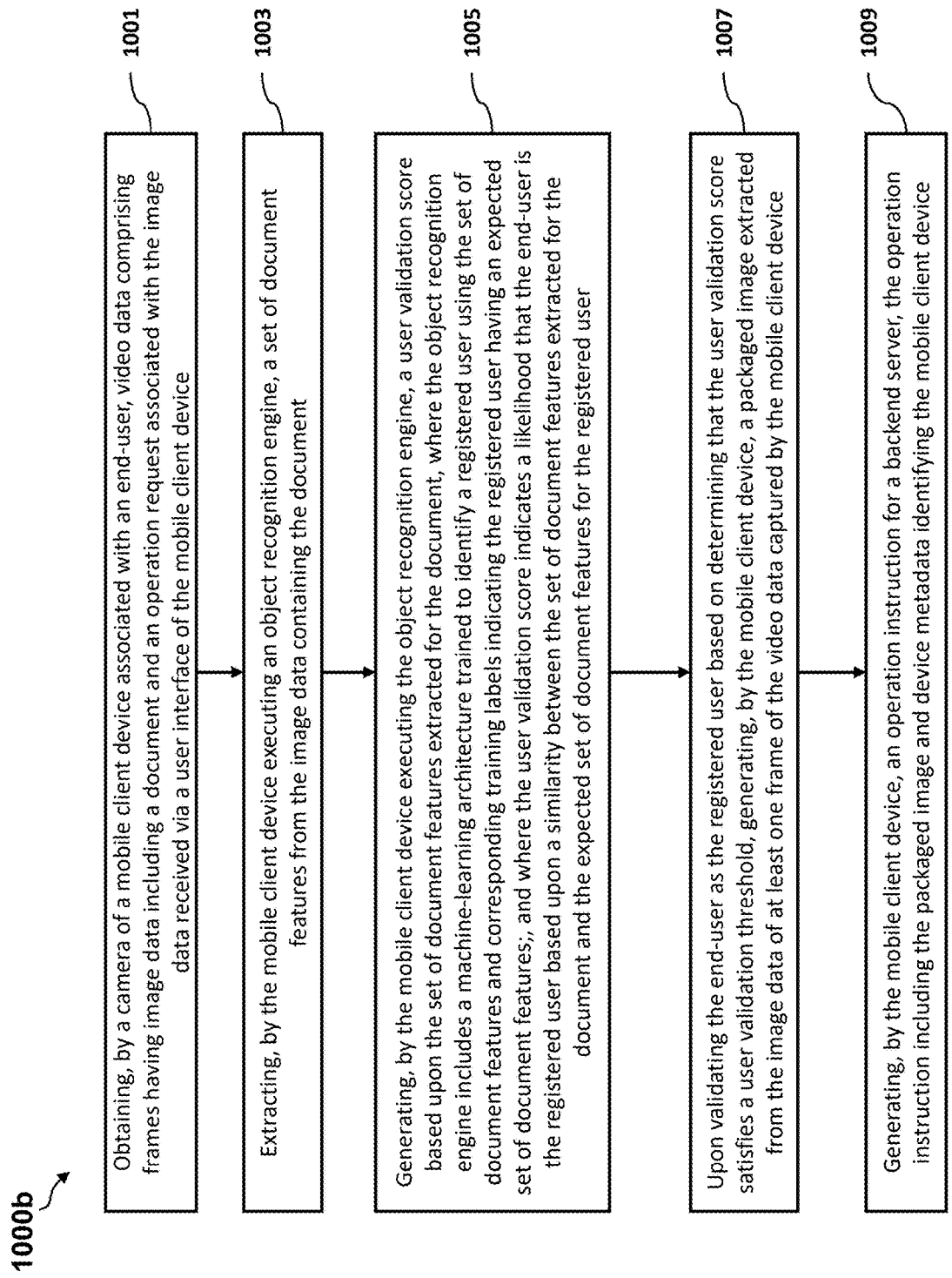
FIG. 10B is a flowchart showing operations of example implementation of the method of FIG. 10A, in accordance with some embodiments.

FIG. 10B is a flowchart of an example method 1000b as an example implementation of the method 1000a in FIG. 10A, as method 1000b for client-side validation of document-imagery for remote processing and validating an end-user associated with a user-requested operation for a remote backend server or other computing device (e.g., the computing device 230 or the provider servers 112).

At operation 1001, obtaining, by a camera of a mobile client device associated with an end-user, video data comprising a plurality of frames having image data including a document and an operation request associated with the image data received via a user interface of the mobile client device. At operation 1003, extracting, by the mobile client device executing an object recognition engine, a set of document features from the image data containing the document.

At operation 1005, generating, by the mobile client device executing the object recognition engine, a user validation score based upon the set of document features extracted for the document. The object recognition engine includes a machine-learning architecture trained to identify a registered user using the set of document features and corresponding training labels indicating the registered user having an expected set of document features, the user validation score indicating a likelihood that the end-user is the registered user based upon a similarity between the set of document features extracted for the document and the expected set of document features for the registered user.

At operation 1007, upon validating the end-user as the registered user based on determining that the user validation score satisfies a user validation threshold, generating, by the mobile client device, a packaged image extracted from the image data of at least one frame of the plurality of frames of the video data captured by the mobile client device.

At operation 1009, generating, by the mobile client device, an operation instruction for a backend server, the operation instruction including the packaged image and device metadata identifying the mobile client device.

In some embodiments, an end-user device may include at least one integrated circuit (IC), such as a processor (e.g., CPU, GPU) or application specific integrated circuit (ASIC), for a machine-learning architecture (e.g., neural network architecture). The IC may comprise a plurality of neurons organized in an array, wherein each neuron comprises a register, a microprocessor, and at least one input; and a plurality of synaptic circuits, each synaptic circuit including a memory for storing a synaptic weight, wherein each neuron is connected to at least one other neuron via one of the plurality of synaptic circuits. The components of the IC may be specially customized for a specific machine-learning architecture or application, such as the machine-learning models and other aspects of the machine-learning architecture of the object recognition engine described herein. These specialized IC hardware components may perform the various processes for handling operations requests and document image-processing, as described herein, which provide superior computing capabilities and reduced electricity consumption compared to traditional CPUs or hardware implementing the various processes for handling operations requests and document image-processing, as described herein.

The computing device may validate the end-user as an expected or registered user in response to determining that the user validation score satisfies a user validation threshold. In response to validating the end-user as the registered user, the computing device may transmit the image data of the document object to a remote computer via one or more networks. In some cases, the computing device may execute one or more remedial operations for the operation request, in response to determining that the user validation score fails to satisfy a user validation threshold. Non-limiting examples of a remedial action may include generating a prompt or request for additional image data or additional authenticating data for the user, or halting or ceasing an ongoing operation, or closing or halting an application execution, among others.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for client-side validation of document-imagery for remote processing, the method comprising:
   obtaining, by a camera of a mobile client device associated with an end-user, video data comprising a plurality of frames having image data including a document and an operation request associated with the image data received via a user interface of the mobile client device;
   extracting, by the mobile client device executing an object recognition engine, a set of document features from the image data containing the document;
   generating, by the mobile client device executing the object recognition engine, a user validation score based upon the set of document features extracted for the document, wherein the object recognition engine includes a machine-learning architecture trained to identify a registered user using the set of document features and corresponding training labels indicating the registered user having an expected set of document features, the user validation score indicating a likelihood that the end-user is the registered user based upon a similarity between the set of document features extracted for the document and the expected set of document features for the registered user; and
   in response to validating the end-user as the registered user based on determining that the user validation score satisfies a user validation threshold:
      generating, by the mobile client device, a packaged image extracted from the image data of at least one frame of the plurality of frames of the video data captured by the mobile client device; and
      generating, by the mobile client device, an operation instruction for a backend server, the operation instruction including the packaged image and device metadata identifying the mobile client device; or
   in response to non-validation of the end-user as the registered user based on determining that the user validation score does not satisfy the user validation threshold:
      generating, by the mobile client device, a notification comprising an indication of the non-validation.

2. The method of claim 1, wherein obtaining the operation request includes receiving, by the mobile client device, via the user interface of the mobile client device the operation request indicating at least one operation to be performed in accordance with the document in the image data.

3. The method of claim 1, further comprising, in response to validating the end-user as the registered user, transmitting, by the mobile client device, the image data of the document and the device metadata from a mobile wallet, to the backend server via one or more networks.

4. The method of claim 1, further comprising executing, by the mobile client device, one or more remedial operations for the operation request, in response to determining that the user validation score fails to satisfy the user validation threshold.

5. The method of claim 4, wherein a remedial operation of the one or more remedial operations includes at least one of:
generating a prompt for additional authenticating data of the end-user for display at the user interface, halting the operation request, or halting an application executed at the mobile client device.

6. The method of claim 1, wherein obtaining the image data includes parsing, by the mobile client device, pixel data at a portion of the image data containing the portion of the document, and
wherein the mobile client device extracts the set of document features of the document using the portion of the pixel data, and generates the user validation score based upon the set of document features extracted for the portion of the document.

7. The method of claim 1, wherein obtaining the image data includes receiving, by the mobile client device, a video feed from the camera comprising the plurality of frames containing the image data containing the document.

8. The method of claim 1, wherein obtaining the image data includes receiving, by the mobile client device, the video data comprising the plurality of frames having the image data from the camera of the mobile client device.

9. The method of claim 1, wherein the mobile client device trains the object recognition engine for detecting the set of document features of the document based upon a training dataset comprising a plurality of training document images corresponding to the training labels, at least one training label indicating a document type of the document.

10. The method of claim 1, wherein the mobile client device trains the object recognition engine for generating the user validation score based upon a training dataset comprising a plurality of prior document images associated with the registered user corresponding to the training labels, at least training label indicating at least one of a user identifier associated with the registered user and a corresponding prior document image or the set of document features of the corresponding prior document image.

11. A system for client-side validation of document-imagery for remote processing, the system comprising:
a mobile client device associated with an end-user comprising at least one processor and a camera, configured to:
obtain, by the camera, video data comprising a plurality of frames having image data including a document and an operation request associated with the image data received via a user interface of the mobile client device;
extract, executing an object recognition engine, a set of document features from the image data containing the document;
generate, executing the object recognition engine, a user validation score based upon the set of document features extracted for the document, wherein the object recognition engine includes a machine-learning architecture trained to identify a registered user using the set of document features and corresponding training labels indicating the registered user having an expected set of document features, the user validation score indicating a likelihood that the end-user is the registered user based upon a similarity between the set of document features extracted for the document and the expected set of document features for the registered user;
in response to the mobile client device validating the end-user as the registered user based on determining that the user validation score satisfies a user validation threshold,
generate a packaged image extracted from the image data of at least one frame of the plurality of frames of the video data captured by the mobile client device; and
generate an operation instruction for a backend server, the operation instruction including the packaged image and device mobile metadata identifying the mobile client device; or
in response to non-validation of the end-user as the registered user based on determining that the user validation score does not satisfy the user validation threshold, generate a notification comprising an indication of the non-validation.

12. The system of claim 11, wherein when obtaining the operation request the mobile client device is configured to receive via the user interface of the mobile client device the operation request indicating at least one operation to be performed in accordance with the document in the image data.

13. The system of claim 11, wherein the mobile client device is configured to, in response to validating the end-user as the registered user, transmit the image data of the document and the device metadata from a mobile wallet, to the backend server via one or more networks.

14. The system of claim 11, wherein the mobile client device is configured to execute one or more remedial operations for the operation request, in response to determining that the user validation score fails to satisfy the user validation threshold.

15. The system of claim 14, wherein a remedial operation of the one or more remedial operations includes at least one of:
generating a prompt for additional authenticating data of the end-user for display at the user interface, halting the operation request, or halting an application executed at the mobile client device.

16. The system of claim 11, wherein when obtaining the image data the mobile client device is configured to parse pixel data at a portion of the image data containing the portion of the document, and
wherein the mobile client device is configured to extract the set of document features of the document using the portion of the pixel data, and generate the user validation score based upon the set of document features extracted for the portion of the document.

17. The system of claim 11, wherein when obtaining the image data includes the mobile client device is configured to receive a video feed from the camera comprising the plurality of frames containing the image data containing the document.

18. The system of claim 11, wherein when obtaining the image data includes the mobile client device is configured to receive the video data comprising the plurality of frames having the image data from the camera of the mobile client device.

19. The system of claim 11, wherein the mobile client device is configured to train the object recognition engine for detecting the set of document features of the document based upon a training dataset comprising a plurality of training document images corresponding to the training labels, at least one training label indicating a document type of the document.

20. The system of claim 11, wherein the mobile client device is configured to train the object recognition engine for generating the user validation score based upon a training dataset comprising a plurality of prior document images associated with the registered user corresponding to the training labels, at least training label indicating at least one of a user identifier associated with the registered user and a corresponding prior document image or the set of document features of the corresponding prior document image.

* * * * *